United States Patent
Ott et al.

(10) Patent No.: US 11,100,062 B2
(45) Date of Patent: *Aug. 24, 2021

(54) SUPPRESSION AND DEDUPLICATION OF PLACE-ENTITIES ON ONLINE SOCIAL NETWORKS

(71) Applicant: Facebook, Inc., Menlo Park, CA (US)

(72) Inventors: Myle Arif Ott, New York, NY (US); Jason Luis Briceno, New York, NY (US); Yaniv Shmueli, Millburn, NJ (US)

(73) Assignee: Facebook, Inc., Menlo Park, CA (US)

( * ) Notice: Subject to any disclaimer, the term of this patent is extended or adjusted under 35 U.S.C. 154(b) by 162 days.

This patent is subject to a terminal disclaimer.

(21) Appl. No.: 16/379,636

(22) Filed: Apr. 9, 2019

(65) Prior Publication Data

US 2019/0236057 A1  Aug. 1, 2019

Related U.S. Application Data

(63) Continuation of application No. 15/192,702, filed on Jun. 24, 2016, now Pat. No. 10,282,434.
(Continued)

(51) Int. Cl.
*G06F 16/20* (2019.01)
*G06F 16/215* (2019.01)
(Continued)

(52) U.S. Cl.
CPC .......... *G06F 16/215* (2019.01); *G06F 16/285* (2019.01); *G06F 16/29* (2019.01);
(Continued)

(58) Field of Classification Search
CPC .... G06F 16/215; G06F 16/285; G06F 16/951; G06F 16/29; G06F 16/9024; H04L 51/20;
(Continued)

(56) References Cited

U.S. PATENT DOCUMENTS 5,918,014 A  6/1999  Robinson
6,539,232 B2  3/2003  Hendrey
(Continued)

OTHER PUBLICATIONS

Maja Kabiljo; "Recommending items to more than a billion people," https://code.facebook.com/posts/861999383875667/recommending-items-to-more-than-a-billion-people/, Jun. 2, 2015.
(Continued)

*Primary Examiner* — Tarek Chbouki
(74) *Attorney, Agent, or Firm* — Baker Botts L.L.P.

(57) ABSTRACT

In one embodiment, a method includes receiving from a client system a search query, identifying a first place-entity based on the search query, accessing a place-entities graph comprising a plurality of place-entity nodes, each place-entity node representing a particular place-entity associated with a particular geographic location, wherein the first place-entity is represented by a first place-entity node, accessing a redirection graph comprising the plurality of place-entity nodes and a plurality of place-entity clusters, each place-entity node in a place-entity cluster having a redirection edge connecting the place-entity node to a canonical place-entity node of the respective place-entity cluster, and sending a response to the search query, wherein if the first place-entity node is connected to a canonical place-entity node by a redirection edge within the redirection graph, the response comprises a reference to the canonical place-entity node, else the response comprises a reference to the first place-entity node.

20 Claims, 14 Drawing Sheets

Related U.S. Application Data

(60) Provisional application No. 62/277,179, filed on Jan. 11, 2016.

(51) Int. Cl.

| | | |
|---|---|---|
| *H04L 12/58* | (2006.01) | |
| *G06F 16/29* | (2019.01) | |
| *G06F 16/28* | (2019.01) | |
| *G06F 16/951* | (2019.01) | |
| *G06F 16/901* | (2019.01) | |
| *H04L 29/08* | (2006.01) | |
| *H04W 4/80* | (2018.01) | |
| *H04W 4/02* | (2018.01) | |
| *G06Q 50/00* | (2012.01) | |
| *H04W 4/029* | (2018.01) | |

(52) U.S. Cl.
CPC ........ *G06F 16/9024* (2019.01); *G06F 16/951* (2019.01); *H04L 51/20* (2013.01); *H04L 51/32* (2013.01); *H04L 67/02* (2013.01); *H04L 67/2814* (2013.01); *H04L 67/306* (2013.01); *H04W 4/02* (2013.01); *H04W 4/80* (2018.02); *G06Q 50/01* (2013.01); *H04W 4/029* (2018.02)

(58) Field of Classification Search
CPC ..... H04L 51/32; H04L 67/02; H04L 67/2814; H04L 67/306; H04W 4/02; H04W 4/80; H04W 4/029; G06Q 50/01
See application file for complete search history.

(56) References Cited

U.S. PATENT DOCUMENTS

| | | |
|---|---|---|
| 6,957,184 B2 | 10/2005 | Schmid |
| 7,069,308 B2 | 6/2006 | Abrams |
| 7,379,811 B2 | 5/2008 | Rasmussen |
| 7,539,697 B1 | 5/2009 | Akeila |
| 7,565,157 B1 | 6/2009 | Ortega |
| 7,752,326 B2 | 7/2010 | Smit |
| 7,783,630 B1 | 8/2010 | Chevalier |
| 7,836,044 B2 | 11/2010 | Kamvar |
| 8,027,990 B1 | 9/2011 | Mysen |
| 8,055,673 B2 | 11/2011 | Churchill |
| 8,060,639 B2 | 11/2011 | Smit |
| 8,082,278 B2 | 12/2011 | Agrawal |
| 8,112,529 B2 | 2/2012 | Van Den Oord |
| 8,135,721 B2 | 3/2012 | Joshi |
| 8,145,636 B1 | 3/2012 | Jeh |
| 8,180,804 B1 | 5/2012 | Narayanan |
| 8,185,558 B1 | 5/2012 | Narayanan |
| 8,239,364 B2 | 8/2012 | Wable |
| 8,244,848 B1 | 8/2012 | Narayanan |
| 8,271,471 B1 | 9/2012 | Kamvar |
| 8,271,546 B2 | 9/2012 | Gibbs |
| 8,301,639 B1 | 10/2012 | Myllymaki |
| 8,306,922 B1 | 11/2012 | Kunal |
| 8,312,056 B1 | 11/2012 | Peng |
| 8,321,364 B1 | 11/2012 | Gharpure |
| 8,364,709 B1 | 1/2013 | Das |
| 8,386,465 B2 | 2/2013 | Ansari |
| 8,407,200 B2 | 3/2013 | Wable |
| 8,412,749 B2 | 4/2013 | Fortuna |
| 8,463,295 B1* | 6/2013 | Caralis ................. H04W 4/021 455/456.3 |
| 8,538,960 B2 | 9/2013 | Wong |
| 8,572,129 B1 | 10/2013 | Lee |
| 8,578,274 B2 | 11/2013 | Druzgalski |
| 8,595,297 B2 | 11/2013 | Marcucci |
| 8,601,027 B2 | 12/2013 | Behforooz |
| 8,606,721 B1 | 12/2013 | Dicker |
| 8,639,725 B1 | 1/2014 | Udeshi |
| 8,732,208 B2 | 5/2014 | Lee |
| 8,751,521 B2 | 6/2014 | Lee |
| 8,775,324 B2 | 7/2014 | Zhu |
| 8,782,080 B2 | 7/2014 | Lee |
| 8,782,753 B2 | 7/2014 | Lunt |
| 8,832,111 B2 | 9/2014 | Venkataramani |
| 8,868,590 B1 | 10/2014 | Donneau-Golencer |
| 8,868,603 B2 | 10/2014 | Lee |
| 8,898,226 B2 | 11/2014 | Tiu |
| 8,909,637 B2 | 12/2014 | Patterson |
| 8,914,392 B2 | 12/2014 | Lunt |
| 8,918,418 B2 | 12/2014 | Lee |
| 8,924,406 B2 | 12/2014 | Lunt |
| 8,935,255 B2 | 1/2015 | Sankar |
| 8,935,261 B2 | 1/2015 | Pipegrass |
| 8,935,271 B2 | 1/2015 | Lassen |
| 8,949,232 B2 | 2/2015 | Harrington |
| 8,949,250 B1 | 2/2015 | Garg |
| 8,949,261 B2 | 2/2015 | Lunt |
| 8,954,675 B2 | 2/2015 | Venkataramani |
| 8,983,991 B2 | 3/2015 | Sankar |
| 9,602,965 B1 | 3/2017 | Kalis |
| 2002/0059199 A1 | 5/2002 | Harvey |
| 2002/0086676 A1 | 7/2002 | Hendrey |
| 2002/0196273 A1 | 12/2002 | Krause |
| 2003/0154194 A1 | 8/2003 | Jonas |
| 2003/0208474 A1 | 11/2003 | Soulanille |
| 2004/0088325 A1 | 5/2004 | Elder |
| 2004/0172237 A1 | 9/2004 | Saldanha |
| 2004/0215793 A1 | 10/2004 | Ryan |
| 2004/0243568 A1 | 12/2004 | Wang |
| 2004/0255237 A1 | 12/2004 | Tong |
| 2005/0091202 A1 | 4/2005 | Thomas |
| 2005/0125408 A1 | 6/2005 | Somaroo |
| 2005/0131872 A1 | 6/2005 | Calbucci |
| 2005/0171955 A1 | 8/2005 | Hull |
| 2005/0256756 A1 | 11/2005 | Lam |
| 2006/0041597 A1 | 2/2006 | Conrad |
| 2006/0117378 A1 | 6/2006 | Tam |
| 2006/0136419 A1 | 6/2006 | Brydon |
| 2006/0190436 A1 | 8/2006 | Richardson |
| 2007/0174304 A1 | 7/2007 | Shrufi |
| 2007/0226187 A1* | 9/2007 | Beatty ................. G06F 16/9027 |
| 2007/0277100 A1 | 11/2007 | Sheha |
| 2008/0005064 A1 | 1/2008 | Sarukkai |
| 2008/0033926 A1 | 2/2008 | Matthews |
| 2008/0072180 A1 | 3/2008 | Chevalier |
| 2008/0102856 A1* | 5/2008 | Fortescue ............. H04W 4/029 455/456.1 |
| 2008/0114730 A1 | 5/2008 | Larimore |
| 2008/0133124 A1 | 6/2008 | Sarkeshik |
| 2008/0183694 A1 | 7/2008 | Cane |
| 2008/0183695 A1 | 7/2008 | Jadhav |
| 2008/0270615 A1 | 10/2008 | Centola |
| 2009/0006543 A1 | 1/2009 | Smit |
| 2009/0054043 A1 | 2/2009 | Hamilton |
| 2009/0094200 A1 | 4/2009 | Baeza-Yates |
| 2009/0164408 A1 | 6/2009 | Grigorik |
| 2009/0164431 A1 | 6/2009 | Zivkovic |
| 2009/0164929 A1 | 6/2009 | Chen |
| 2009/0197681 A1 | 8/2009 | Krishnamoorthy |
| 2009/0228296 A1 | 9/2009 | Ismalon |
| 2009/0259624 A1 | 10/2009 | DeMaris |
| 2009/0259646 A1 | 10/2009 | Fujita |
| 2009/0265326 A1 | 10/2009 | Lehrman |
| 2009/0271370 A1 | 10/2009 | Jagadish |
| 2009/0276414 A1 | 11/2009 | Gao |
| 2009/0281988 A1 | 11/2009 | Yoo |
| 2009/0299963 A1 | 12/2009 | Pippori |
| 2010/0049802 A1 | 2/2010 | Raman |
| 2010/0057723 A1 | 3/2010 | Rajaram |
| 2010/0082695 A1 | 4/2010 | Hardt |
| 2010/0125562 A1 | 5/2010 | Nair |
| 2010/0145771 A1 | 6/2010 | Fligler |
| 2010/0161215 A1 | 6/2010 | Karani |
| 2010/0179929 A1 | 7/2010 | Yin |
| 2010/0197318 A1 | 8/2010 | Petersen |
| 2010/0228744 A1 | 9/2010 | Craswell |
| 2010/0235354 A1 | 9/2010 | Gargaro |
| 2010/0279708 A1 | 11/2010 | Lidsrom |
| 2010/0321399 A1 | 12/2010 | Ellren |

(56) References Cited

U.S. PATENT DOCUMENTS

| | | |
|---|---|---|
| 2011/0022602 A1 | 1/2011 | Luo |
| 2011/0078166 A1 | 3/2011 | Oliver |
| 2011/0087534 A1 | 4/2011 | Strebinger |
| 2011/0137902 A1 | 6/2011 | Wable |
| 2011/0184945 A1 | 7/2011 | Das |
| 2011/0184981 A1 | 7/2011 | Lu |
| 2011/0191371 A1 | 8/2011 | Elliott |
| 2011/0196855 A1 | 8/2011 | Wable |
| 2011/0231296 A1 | 9/2011 | Gross |
| 2011/0276396 A1 | 11/2011 | Rathod |
| 2011/0313992 A1 | 12/2011 | Groeneveld |
| 2011/0320470 A1 | 12/2011 | Williams |
| 2012/0047147 A1 | 2/2012 | Redstone |
| 2012/0059708 A1 | 3/2012 | Galas |
| 2012/0136852 A1 | 5/2012 | Geller |
| 2012/0166432 A1 | 6/2012 | Tseng |
| 2012/0166433 A1 | 6/2012 | Tseng |
| 2012/0179637 A1 | 7/2012 | Juan |
| 2012/0185472 A1 | 7/2012 | Ahmed |
| 2012/0185486 A1 | 7/2012 | Voigt |
| 2012/0209832 A1 | 8/2012 | Neystadt |
| 2012/0221581 A1 | 8/2012 | Narayanan |
| 2012/0271831 A1 | 10/2012 | Narayanan |
| 2012/0278127 A1 | 11/2012 | Kirakosyan |
| 2012/0284329 A1 | 11/2012 | Van Den Oord |
| 2012/0290950 A1 | 11/2012 | Rapaport |
| 2012/0310922 A1 | 12/2012 | Johnson |
| 2012/0311034 A1 | 12/2012 | Goldband |
| 2012/0317088 A1 | 12/2012 | Pantel |
| 2012/0331063 A1 | 12/2012 | Rajaram |
| 2013/0031106 A1 | 1/2013 | Schechter |
| 2013/0031113 A1 | 1/2013 | Feng |
| 2013/0041876 A1 | 2/2013 | Dow |
| 2013/0066876 A1 | 3/2013 | Raskino |
| 2013/0073400 A1 | 3/2013 | Heath |
| 2013/0085970 A1 | 4/2013 | Karnik |
| 2013/0086024 A1 | 4/2013 | Liu |
| 2013/0086057 A1 | 4/2013 | Harrington |
| 2013/0097140 A1 | 4/2013 | Scheel |
| 2013/0103697 A1 | 4/2013 | Hill |
| 2013/0124538 A1 | 5/2013 | Lee |
| 2013/0124542 A1 | 5/2013 | Lee |
| 2013/0144899 A1 | 6/2013 | Lee |
| 2013/0166526 A1 | 6/2013 | Moxley |
| 2013/0173633 A1 | 7/2013 | Piepgrass |
| 2013/0191372 A1 | 7/2013 | Lee |
| 2013/0191416 A1 | 7/2013 | Lee |
| 2013/0198219 A1 | 8/2013 | Cohen |
| 2013/0204737 A1 | 8/2013 | Agarwal |
| 2013/0226918 A1 | 8/2013 | Berkhim |
| 2013/0227011 A1 | 8/2013 | Sharma |
| 2013/0246404 A1 | 9/2013 | Annau |
| 2013/0254305 A1 | 9/2013 | Cheng |
| 2014/0006416 A1 | 1/2014 | Leslie |
| 2014/0067535 A1 | 3/2014 | Rezaei |
| 2014/0122465 A1 | 5/2014 | Bilinski |
| 2014/0244619 A1 | 8/2014 | Doroshenko |
| 2015/0142822 A1 | 5/2015 | Xue |
| 2016/0321345 A1 | 11/2016 | Todic |
| 2017/0052958 A1 | 2/2017 | Manning |
| 2017/0132226 A1 | 5/2017 | Kalis |
| 2017/0134508 A1 | 5/2017 | Kalis |
| 2017/0199927 A1 | 7/2017 | Moore |
| 2017/0201851 A1 | 7/2017 | Huang |

OTHER PUBLICATIONS

Avery Ching; Giraph: Production-grade graph processing infrastructure for trillion edge graphs, Jun. 22, 2014.

Zhu, et al.; "Learning from Labeled and Unlabeled Data with Label Propagation", 2002.

* cited by examiner

SUPPRESSION AND DEDUPLICATION OF PLACE-ENTITIES ON ONLINE SOCIAL NETWORKS

PRIORITY

This application is a continuation under 35 U.S.C. § 120 of U.S. patent application Ser. No. 15/192,702, filed 24 Jun. 2016, which claims the benefit, under 35 U.S.C. § 119(e), of U.S. Provisional Patent Application No. 62/277,179, filed 11 Jan. 2016, each of which is incorporated herein by reference.

TECHNICAL FIELD

This disclosure generally relates to online social networks, and in particular to identifying, determining, ranking, or suppressing entities associated with an online social network.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, place-entities stored on an online social network may correspond to particular geographic locations. The place-entities may be stored as place-entity nodes on a social graph of the online social network. The place-entity nodes may also be placed in a place-entities graph. Searches for particular place-entities on the online social network may search the place-entities graph for a matching place-entity. Place-entity nodes may be generated by external websites or databases, partner sites, individual users, or any other suitable source. In particular embodiments, generation of place-entity nodes may result in a high number of low-quality place-entity nodes, or a number of duplicative place-entity nodes that all refer to the same particular geographic location.

In particular embodiments, a customized redirection graph for a place-entity graph of a social-networking system may be created. The place-entity graph may include all place-entity nodes of the social-networking system. In order to improve search functionality, the social-networking system may prioritize providing users with high-quality place-entity nodes when submitting a search. The creation of the redirection graph may include three steps: a suppression process, a deduplication process, and a best-page selection. In the suppression process, place-entity nodes of low-quality are identified and removed from consideration. The removal may be through un-indexing of the node from the place-entities graph, or through down-ranking of the node. Deduplication may identify place-entity nodes with similar attributes that may refer to the same place-entity, and determine whether one of the nodes should be redirected to the other. Best-page selection may identify, from among a cluster of similar place-entity nodes, a "best" or "canonical" node that represents the cluster, and redirect the other nodes in the cluster to the best node. Custom redirection graphs may be used to suit a particular search or any other purpose.

In particular embodiments, identification of low-quality place-entity nodes may be done through a heterogeneous graph. The heterogeneous graph may comprise place-entity nodes, n-gram nodes, and user nodes. N-gram nodes may correspond to n-grams of place names, which may be associated with the place-entity nodes having those place names. Place-entity nodes may be connected to their associated n-gram nodes, and the user nodes may be connected to place-entity nodes based upon a social signal between the user and the place-entity. Initial seed scores may be assigned to some of the place-entity nodes, based upon known determinations that they are high- or low-quality. The seed scores may be propagated through the heterogeneous graph, with each node being assigned a score that is the weighted average of the scores of the connecting nodes. The propagation may be performed iteratively until the scores of the nodes reach convergence. The final scores of the place-entity nodes may be compared to a threshold quality-score.

In particular embodiments, deduplication of place-entity nodes may be performed by clustering place-entity nodes, where each place-entity cluster is determined to be referring to the same place-entity. A duplication score may be calculated by comparing the place-entity nodes to determine whether the place-entity nodes belong in the same cluster. The duplication score may be compared to a threshold redirect-score to determine whether a place-entity node should be redirected to another place-entity node.

In particular embodiments, for a place-entity cluster, a single canonical place-entity node may be selected, with the other place-entity nodes in the cluster having a redirection edge to the canonical place-entity cluster. The quality of the redirection graph may be evaluated by finding sample place-entity clusters and assigning a score to each place-entity node in the cluster based on an initial score based on a class of the node, and an adjustment to the score based on social signals associated with the place-entity node. The highest-scoring place-entity node may be determined to be the canonical place-entity node.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

System Overview

Figure 1:
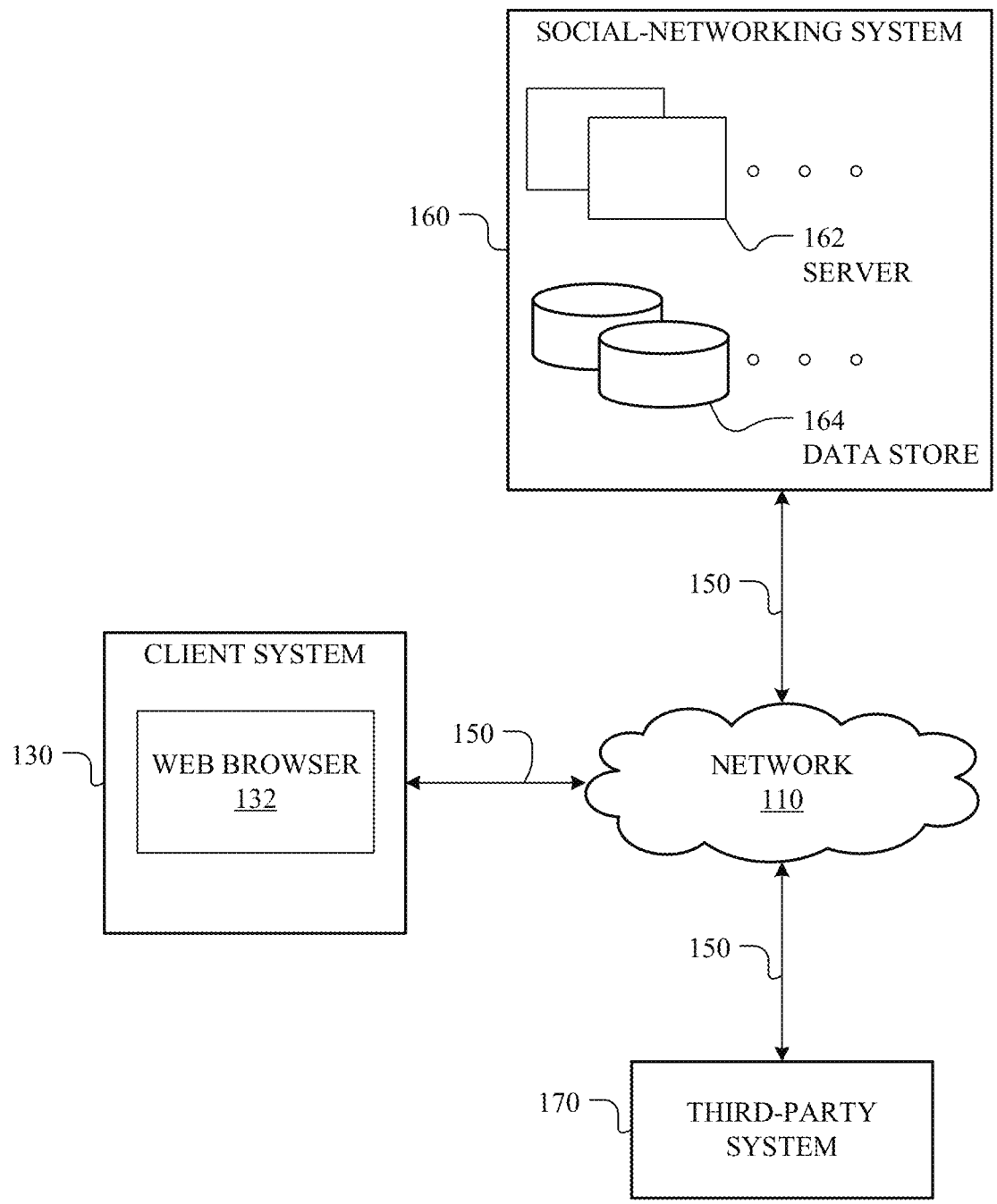
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. As an example and not by way of limitation, client system 130 may access social-networking system 160 using a web browser 132, or a native application associated with social-networking system 160 (e.g., a mobile social-networking application, a messaging application, another suitable application, or any combination thereof) either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 to whom they want to be connected. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, are in any way related, or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Social Graphs

Figure 2:
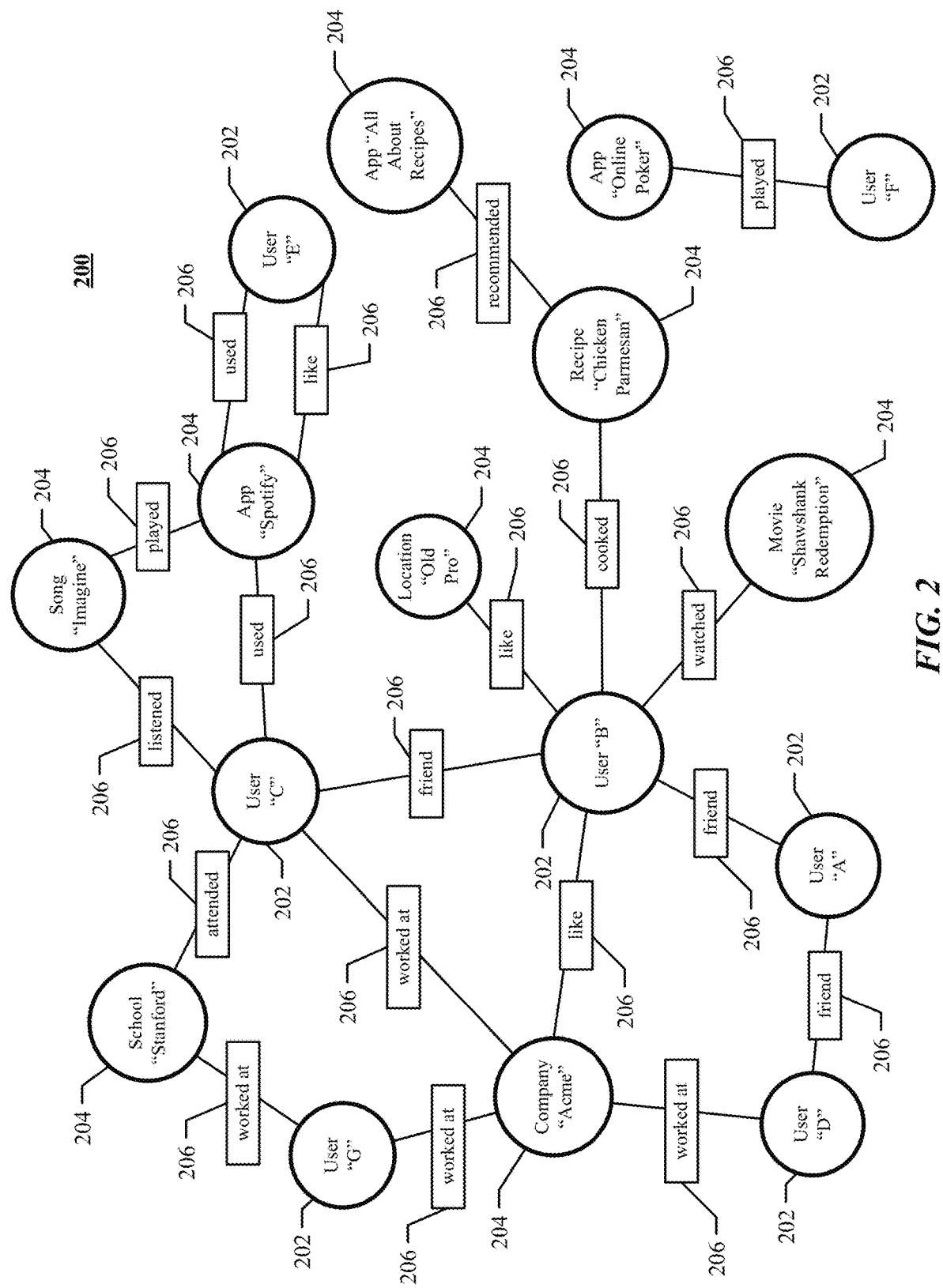
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to social-networking system 160 a message indicating the user's action. In response to the message, social-networking system 160 may create an edge (e.g., a check-in-type edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to an edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened"

edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Location Information

In particular embodiments, the social-networking system 160 may determine a geographic location (hereinafter also "location") of an object (e.g., a user, a concept, or a mobile-client system 130 associated with a user or concept). The location of an object may be identified and stored as a street address (e.g., "1601 Willow Road, Menlo Park, Calif."), a set of geographic coordinates (e.g., latitude and longitude), a reference to another location or object (e.g., "the coffee shop next to the train station"), a reference to a map tile (e.g., "map tile 32"), or using another suitable identifier. In particular embodiments, the location of an object may be provided by a user of an online social network. As an example and not by way of limitation, a user may input his location by checking-in at the location or otherwise providing an indication of his location. As another example and not by way of limitation, a user may input the location of a concept (e.g., a place or venue) by accessing the profile page for the concept and entering the location information (e.g., the stress address) of the concept.

In particular embodiment, the location of a mobile-client system 130 equipped with cellular, Wi-Fi, Global Positioning System (GPS), or other suitable capabilities may be identified with geographic-positioning signals. As an example and not by way of limitation, a mobile-client system 130 may include one or more sensors that may facilitate geo-location functionalities of the system. Processing of sensor inputs by the mobile-client system 130 with one or more sensor devices (for example, processing a GPS sensor signal and displaying in the device's graphical user interface a map of a location corresponding to the GPS sensor signal) may be implemented by a combination of hardware, software, and/or firmware (or device drivers). Geographic-positioning signals may be obtained by cell tower triangulation, Wi-Fi positioning, or GPS positioning. In particular embodiments, a geographic location of an Internet-connected computer can be identified by the computer's IP address. A mobile-client system 130 may also have additional functionalities incorporating geographic-location data of the device, such as, for example, providing driving directions, displaying a map of a current location, or providing information of nearby points of interest such as restaurants, gas stations, etc. As an example and not by way of limitation, a web browser application on the mobile-client system 130 may access a mapping library (e.g., via a function call) that generates a map containing a GPS location obtained by a device driver interpreting a GPS signal from a GPS sensor, and display the map in the web browser application's graphical user interface. In particular embodiments, the location of a user may be determined from a search history associated with the user. As an example and not by way of limitation, if a particular user has previously queried for objects in a particular location, the social-networking system 160 (or the search-engine system 170) may assume that the user is still at that particular location. Although this disclosure describes determining the location of an object in a particular manner, this disclosure contemplates determining the location of an object in any suitable manner.

In particular embodiments, the social-networking system 160 may maintain a database of information relating to locations or places. The social-networking system 160 may also maintain meta information about particular locations or places, such as, for example, photos of a location or place, advertisements, user reviews, comments, "check-in" activity data, "like" activity data, hours of operation, or other suitable information related to the location or place. In particular embodiments, a location or place may correspond to a concept node 204 in a social graph 200. The social-networking system 160 may allow users to access information regarding a location or place using a client application (e.g., a web browser or other suitable application) hosted by a mobile-client system 130. As an example and not by way of limitation, social-networking system 160 may serve webpages (or other structured documents) to users that request information about a location or place. In addition to user profile and location information, the system may track or maintain other information about the user. As an example and not by way of limitation, the social-networking system 160 may support geo-social-networking functionality including one or more location-based services that record the user's location. As an example and not by way of limitation, users may access the geo-social-networking system using a special-purpose client application hosted by a mobile-client system 130 of the user (or a web- or network-based application using a browser client). The client application may automatically access GPS or other geo-location functions supported by the mobile-client system 130 and report the user's current location to the geo-social-networking system. In addition, the client application may support geo-social networking functionality that allows users to "check-in" at various locations or places and communicate this location or place to other users. A check-in to a given location or place may occur when a user is physically located at a location or place and, using a mobile-client system 130, access the geo-social-networking system to register the user's presence at the location or place. The social-networking system 160 may automatically check-in a user to a location or place based on the user's current location and past location data. In particular embodiments, the social-networking system 160 may allow users to indicate other types of relationships with respect to particular locations or places, such as "like," "fan," "worked at," "recommended," "attended," or another suitable type of relationship. In particular embodiments, "check-in" information and other relationship information may be represented in the social graph 200 as an edge 206 connecting the user node 202 of the user to the concept node 204 of the location or place.

Redirection Graphs for Place-Entities

In particular embodiments, social-networking system 160 may determine one or more places where a user is most likely located based on geographic-location information received from the user's mobile-client system 130 (e.g., a smartphone) or based on social-networking information associated with the user or the user's location.

As used herein, a "place" may refer to a distinct, identifiable, or defined physical area, space, or location, such as for example, an airport, park, shopping mall, train station, bus stop, business, corporate campus, college campus, stadium, amusement park, museum, house, building, neighborhood, city, store, movie theater, restaurant, or landmark. Examples of places include Sancho's Taqueria, Big Apple Cleaners, Columbus Circle, Central Park, Times Square, the Golden Gate Bridge, LaGuardia airport, Disneyland, the Louvre, and the Eiffel Tower. In particular embodiments, a place may be referred to as a physical place or a geographic place. In particular embodiments, a place may correspond to a particular place-entity represented by a particular node in social graph 200 (e.g., a concept node 204 associated with a particular geographic location). For example, the physical place LaGuardia airport may correspond to a place-entity "LaGuardia airport," which is represented by a concept node 204 in social graph 200. Although this disclosure describes and illustrates particular places which correspond to particular place-entities, this disclosure contemplates any suitable places which correspond to any suitable place-entities. In particular embodiments, a place may have any suitable size or dimension (e.g., a length or width of 1 meter, 10 meters, 100 meters, 1 kilometer, 10 kilometers, or any other suitable distance). As an example and not by way of limitation, a place may correspond to a coffee shop with dimensions of approximately 5 meters by 10 meters. In particular embodiments, one or more places may be located nearby or contained within one or more other places. As an example and not by limitation, an airport is a place that may contain multiple other places, such as for example stores or restaurants. Additionally, an airport may have multiple other places located nearby, such as for example, bus stops, hotels, or parking lots. As another example and not by way of limitation, a multi-story building may be considered a place, and the building may also include one or more other places, such as for example, stores or businesses located within the building. Although this disclosure describes and illustrates particular places having particular sizes and containing or being located nearby particular other places, this disclosure contemplates any suitable places having any suitable sizes and containing or being located nearby any suitable other places.

In particular embodiments, a place-entities graph may represent a plurality of concept nodes 204 each corresponding to a place-entity having a particular geographic location. As an example and not by way of limitation, social-networking system 160 may have a master place-entities graph that includes all concept nodes 204 identified as place-entity nodes in the social graph 200. In particular embodiments, additional functionalities of the place-entities graph may be needed to improve searches of the place-entities graph for a large social-networking system 160 with a large number of nodes of social graph 200 and a large number of place-entities in the place-entities graph.

In particular embodiments, custom redirection graphs may be generated for a set of place-entity nodes or a place-entities graph to improve functionalities of social-networking system 160 that require identification of place-entities. In particular embodiments, the custom redirection graphs may be used to perform various searches based on a context of the search. As an example and not by way of limitation, the custom redirection graphs may be used to create custom place-entity graphs for different types of search functions, such that different entities may be presented in a check-in context, a tagging context, or a recommendation context. In particular embodiments, social-networking system 160 may access a master place-entities graph for social-networking system 160 which indexes all place-entities associated with social-networking system 160. In particular embodiments, the place-entities may be generated from third-party data. As an example and not by way of limitation, the place-entities may be generated from an external website or database. In particular embodiments, the place-entities may be generated from partner sites of social-networking system 160. In particular embodiments, the place-entities may be user generated. In particular embodiments, the place-entities may be generated from any other suitable source.

In particular embodiments, the master place-entities graph may include a number of low-quality place-entities. This may occur in the context of a large social-networking system with potentially millions or billions of associated users and entities, any of whom may generate a place-entity and an associated place-entity node to add to the master place-entities graph. In particular embodiments, multiple place-entities may comprise duplicate locations. As an example and not by way of limitation, there may be multiple place-entities generated for Grand Central Station in New York City. In particular embodiments, particular place-entities may be more popular than other place-entities with users of social-networking system 160. In particular embodiments, place-entities may be user-specific. As an example and not by way of limitation, a particular user may generate a place-entity at their home called "Toby's Pad." This place-entity is likely irrelevant to users except the particular user and potentially friends or family of the particular user.

In particular embodiments, to improve the quality of the place-entities graph, three processes may be performed to create a redirection graph. These three processes may be: a suppression process to remove low-quality place-entities (also called a junk detection process); a deduplication process to determine whether a group of place-entity nodes are related and may be clustered; and a best-page selection process to find the best representative place-entity (a "canonical" place-entity node) for a plurality of related place-entities. In particular embodiments, these processes may be adjusted based on the particular needs or use-case for the place-entities graph. In particular embodiments, separate redirection graphs may be created where each redirection graph is suitable for a particular use or purpose.

In particular embodiments, a suppression process may either remove or suppress place-entities determined to be of low quality. In particular embodiments, removing a place-entity may mean removing the place-entity from the master place-entity graph. In particular embodiments, suppressing a place-entity may mean lowering the rank of the particular place-entity so that it is highly unlikely to be returned in response to a search query. As an example and not by way of limitation, an official page of social-networking system 160 titled "New York City" may be a place-entity with a high quality-score indicating that it is a high-quality place-entity, while an individual user's fan page titled "Joe Loves New York" may be determined to be of low quality, and either un-indexed or down-ranked in the place-entities graph. In particular embodiments, determining the quality of a page may be based on a number of factors, including the accuracy of attributes associated with the place-entity; a number of photos or other media content associated with the place-entity; an amount of content associated with the place-entity; or social signals such as likes, check-ins, or other interactions through social-networking system 160 with the place-entity. As an example and not by way of limitation, attributes of a place-entity may include a category of place such as a home, a store, a park, etc.; operating hours for the place-entity; an address of the place-entity (including an attribute for whether the address is even known); or latitude and longitude coordinates of the place-entity. In particular embodiments, determining the quality of a place-entity may further include an indication of how aggressive the suppression of place-entities for a given context should be. As an example and not by way of limitation, in a context of recommending places to a user, social-networking system 160 may determine that low-quality place-entities should be highly suppressed (by setting a high threshold quality-score) so that users are presented with real, high-quality place-entities, while in a context of tagging, social-networking system 160 may not place as great an importance on elimination of all low-quality place-entities, in order for users to customize their tagging. In particular embodiments, the suppression process may output a filtered place-entities graph. As an example and not by way of limitation, the filtered place-entities graph may have un-indexed all low-quality place-entities. As another example and not by way of limitation, the filtered place-entities graph may comprise the master place-entities graph with quality-scores associated with each place-entity, allowing suppression of low-scoring results in future searches. The suppression process is described in further detail below.

In particular embodiments, the deduplication and best-page selection processes may be applied to a filtered place-entities graph after a suppression process. In particular embodiments, the deduplication and best-page selection processes may occur prior to the suppression process or in concurrence with the suppression process. In particular embodiments, the deduplication process may identify similar or duplicate place-entity nodes and create place-entity clusters based on the identification. In particular embodiments, a pairwise duplication comparison may be performed to generate a duplication-score for a particular pair of place-entity nodes. In particular embodiments, the duplication-score may represent a likelihood that the two place-entity nodes are duplicates. In particular embodiments, determination of duplicate place-entities may be a determination that two or more place-entity nodes are referring to the same place-entity or geographic location. As an example and not by way of limitation, a place-entity node "New York City" and a place-entity node "I Heart NYC" may both refer to the geographic location of the city of New York, N.Y. Place-entity clusters may be created based on the duplication-scores, where a particular cluster may correspond to the same place-entity. In particular embodiments, a threshold duplication-score may be determined for determining whether two or more place-entity nodes should be in the same cluster. If the duplication-score for a pair of place-entities is greater than the threshold score, then the two place-entities may be grouped into the same place-entity cluster. If the duplication-score does not exceed the threshold, then the two place-entities are not placed into the same place-entity cluster.

In particular embodiments, a place-entity cluster may include a best-quality, or canonical, place-entity, as determined by a best-page selection process. As an example and not by way of limitation, an official page of social-networking system 160 for "New York City" may be recognized as the canonical place-entity for New York City, N.Y., while a page titled "The City That Never Sleeps" may be determined to be a lower-quality, duplicate place-entity. In particular embodiments, a redirect from a lower-quality place-entity to a canonical place-entity may be based on the duplication-score between the two place-entities. The redirect may be based on a threshold redirect-score to be compared to the duplication-score. As an example and not by way of limitation, if a threshold redirect-score is set relatively low, then most pairs of low-quality and canonical place-entities will have duplication-scores exceeding the threshold, and a redirect to the canonical place-entity may occur. As another example and not by way of limitation, if the threshold redirect-score is set relatively high, then only place-entities with a high duplication-score (indicating a high degree of similarity) may be redirected to the canonical place-entity. As another example and not by way of limitation, if a threshold score is set very low, any place-entity that includes "Central Park" in its name or description may be redirected to a canonical place-entity node titled "Central Park." If the threshold score is set higher, then a "Central Park" place-entity that has a relatively lower duplication-score (such as place-entity "Central Park West") may not be redirected to the canonical "Central Park" place-entity. In particular embodiments, the threshold redirect-score may be higher than the threshold duplication-score. This may mean that two or more place-entity nodes may be in the same place-entity cluster by exceeding the threshold duplication-score, but they may not redirect to the canonical place-entity node if the duplication-scores do not exceed the threshold redirect-score. In particular embodiments, the threshold redirect-score may be equal to the threshold duplication-score. In this embodiment, for all place-entities of a particular place-entity cluster, all non-canonical place-entity nodes may be redirected to the canonical place-entity node. The process of evaluating the deduplication process for selection of a canonical place-entity node is discussed further below.

In particular embodiments, the suppression, deduplication, and best-page selection processes may result in a redirection graph to be applied to particular use cases. As an example and not by way of limitation, a redirection graph may include the master place-entities graph with quality (e.g. suppression) and duplication scores assigned to each place-entity node, as well as redirect-edges between nodes based on best-page selection. In particular embodiments, the structure and scores for a particular redirection graph may depend on the input parameters applied for the suppression and deduplication processes.

Figure 3:
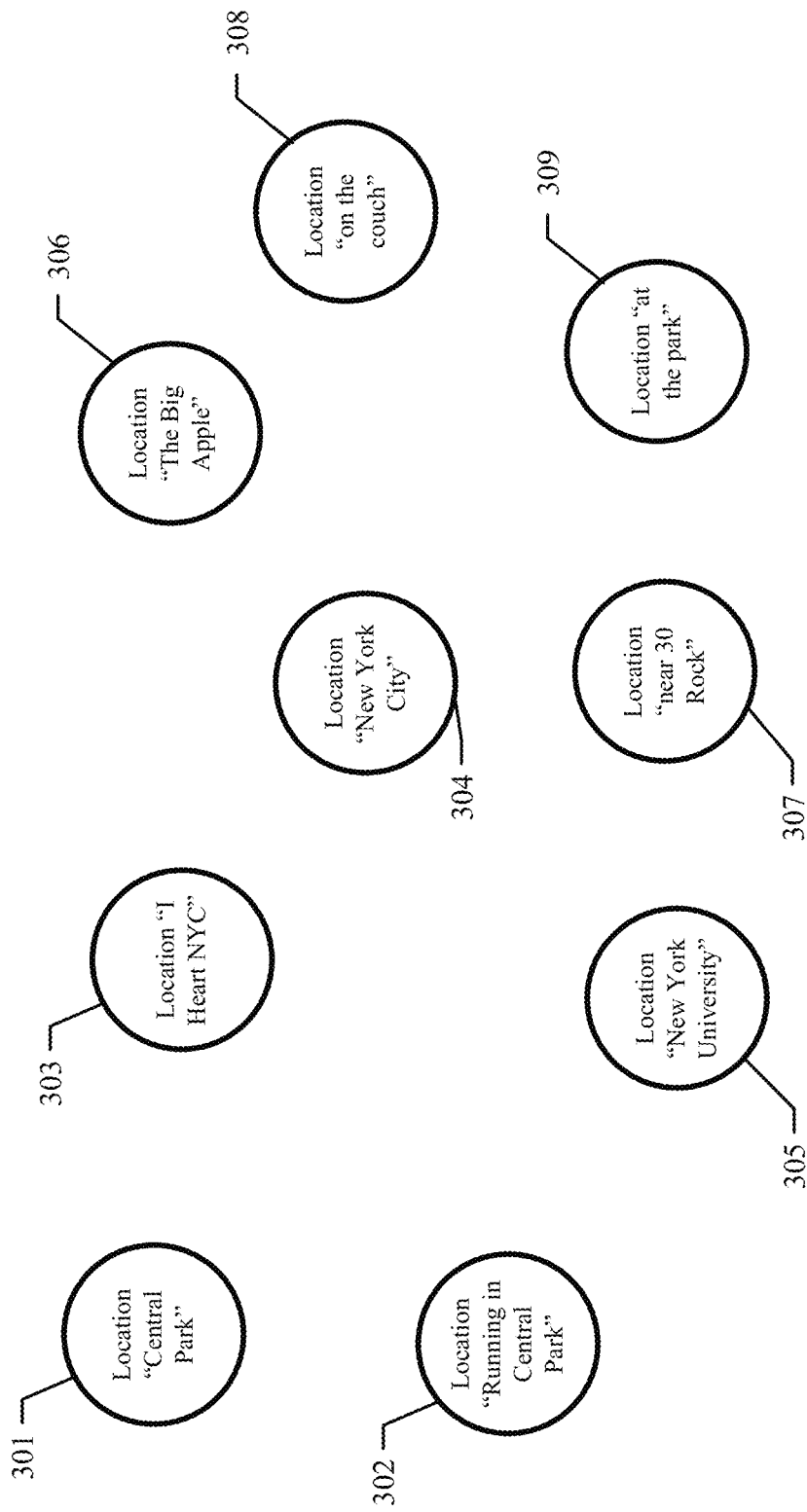
FIG. 3 illustrates an example place-entities graph.

FIG. 3 illustrates an example place-entities graph. Place-entity nodes 301-309 each correspond to a concept node 204 of the social graph 200 that corresponds to a location or place. In the example of FIG. 3, place-entity nodes may correspond to official pages of a location or place such as 304 "New York City" or 305 "New York University." In the example of FIG. 3, other place-entity nodes may be user-generated, such as 303 "I Heart NYC," 302 "Running in Central Park," 309 "at the park," or 308 "on the couch." In the example place-entities graph of FIG. 3, without any further processing in the graph, all of these place-entity nodes are considered similarly for identification of a place-entity, such as a search. As an example and not by way of limitation, if a user searches for the term "Central Park," both 301 "Central Park" and 302 "Running in Central Park" may be surfaced.

Figure 4:
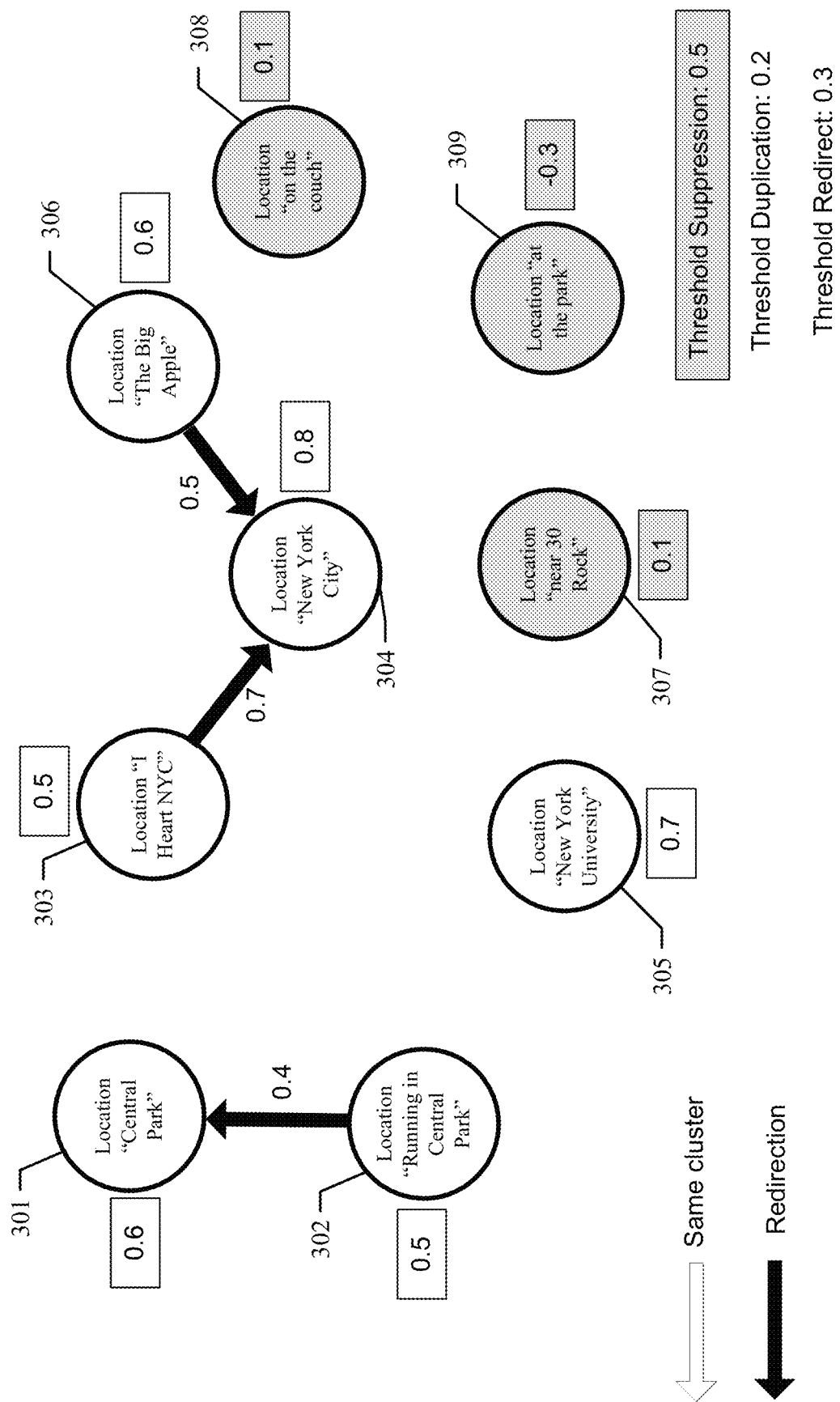
FIG. 4 illustrates an example place-entities redirection graph.

FIG. 4 illustrates an example redirection graph for the place-entities graph of FIG. 3. In the example of FIG. 4, relatively tight suppression and deduplication parameters have been implemented to eliminate "junk" place-entities and redirect lower-quality place-entities to canonical place-entities. As an example and not by way of limitation, relatively tight parameters may be used in the context of searching place-entities for a check-in or to recommend nearby places. As another example and not by way of limitation, the threshold scores for suppression and deduplication may comprise a high threshold quality-score, a low threshold duplication-score, and a low threshold redirect-score, which may increase the chances that a particular place-entity node may be suppressed (by failing to meet the threshold quality-score) or redirected (by exceeding the threshold duplication-score and redirect-score). In these contexts, it may be desirable for users to find or check-in to places that are real or official, and of high quality. In the example of FIG. 4, the suppression process may assign quality-scores and duplication-scores to each place-entity 301-309, and the deduplication process may redirect particular place-entities to a duplicate, canonical place-entity. In the example of FIG. 4, these processes may result in place-entity 308 "on the couch," 307 "near 30 Rock," and 309 "at the park" suppressed by being assigned low quality-scores (represented in FIG. 4 by being grayed-out), and based on their respective duplication-scores, place-entity 302 "Running in Central Park" redirected to 301 "Central Park," and place-entities 303 "I Heart NYC" and 306 "The Big Apple" redirected to 304 "New York City." In this example illustration, if a user attempts to check-in or is looking for nearby places, the available place-entities for selection (depending on the search terms) are real, canonical place-entities 301 "Central Park," 304 "New York City," or 305 "New York University." In particular embodiments, the remaining place-entity nodes are either suppressed or un-indexed from the place-entities graph, or are redirected to the canonical place-entities.

Figure 5:
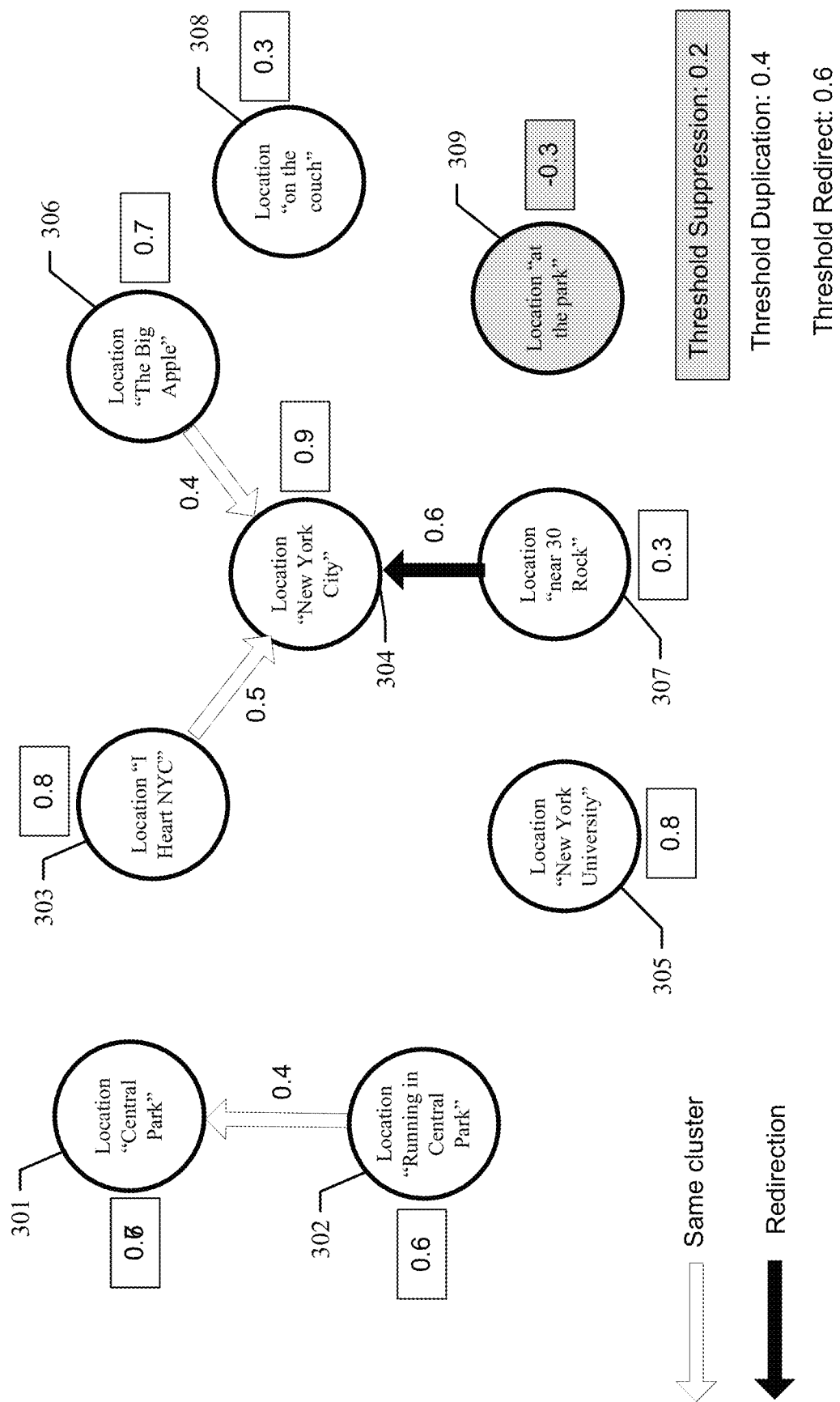
FIG. 5 illustrates an example place-entities redirection graph.

FIG. 5 illustrates an example redirection graph for the place-entities graph of FIG. 3, where the suppression and deduplication parameters are looser compared to the example of FIG. 4. In particular embodiments, looser parameters may be applied in a location-tagging application, in order to provide users with additional options. In the example of FIG. 5, the suppression process may still provide quality-scores for each place-entity 301-309, but the difference between the high-quality nodes and "junk" nodes may be less significant than the example of FIG. 4. Additionally, the threshold scores may be adjusted to allow some lower-scoring place-entity nodes to remain without being suppressed or redirected. In the example of FIG. 5, an increased threshold duplication-score and an adjusted deduplication process to lower duplication-scores between place-entity nodes may decrease the number of redirections, so that place-entities 302 "Running in Central Park," 303 "I Heart NYC," and 306 "The Big Apple" are no longer redirected, although their duplication-scores are still higher than the threshold duplication-score (meaning that they are still clustered to the other place-entity nodes without being redirected), the threshold quality-score may be lowered so that place-entity 308 "on the couch" is not suppressed, and the place-entity 307 "near 30 Rock" is not suppressed but is now redirected to 304 "New York City."

In particular embodiments, two or more redirection graphs may be combined or "stacked" hierarchically or applied together. As an example and not by way of limitation, each of the two or more redirection graphs may be created for different purposes, and may be applied together if a redirection graph is desired for the various purposes. As an example and not by way of limitation, a first graph may handle redirecting alternate names or abbreviations, such as redirecting from "The City that Never Sleeps" to "New York City," or "SFO" to "San Francisco Airport." A second graph may handle language translations, such as redirecting "Nueva York" to "New York City." In a particular application, both graphs may be applied to ensure that regardless of language, abbreviations, or alternate terms being used, a high-quality, canonical place-entity is identified so the other place-entities can be redirected. As another example and not by way of limitation, a first redirection graph may be used to correct spelling (e.g. redirecting "New Yrok" to "New York"), then a second redirection graph may be used for check-in or tagging or other applications.

In particular embodiments, a user may provide a search input to social-networking system 160 to access one or more place-entities. In particular embodiments, an application performing the search may access a particular redirection graph for the place-entities, based on the context. As an example and not by way of limitation, if the user is providing a search input in order to check-in at a location, an application may access a redirection graph created for that purpose. In particular embodiments, based on the selected redirection graph and the search input, a set of matching place-entities may be determined. In particular embodiments, the matching place-entities may be ranked or scored based on the quality and duplication scores from the redirection graph, as well as the existence of canonical place-entity nodes with respect of the matching place-entities. In particular embodiments, the quality-scoring process may also account for parameters specific to the user providing the search input. As an example and not by way of limitation, the user's current location may be used to adjust the quality-scores for place-entities in proximity to the current location. As another example and not by way of limitation, a user's connections on social-networking system 160 may be used to adjust the scores. Using the example of FIG. 3, for most user search requests for check-ins, place-entity node 308 "on the couch" may be suppressed as being low-quality. However, if social-networking system 160 determines that the user providing the search input is the user that generated place-entity node 308, or is a first-degree connection to the user that generated place-entity 308, the suppression process may not suppress place-entity 308 for that user, while still suppressing it for other users who are not associated with the generating user.

In particular embodiments, based on the ranking and scoring of matching place-entities, a number of top-scoring entities may be selected. In particular embodiments, a redirect process may be applied to resolve any redirects between the selected place-entities. As an example and not by way of limitation, a high-scoring place-entity node may still be redirected to canonical place-entity nodes. In particular embodiments, after the redirect process is applied, a number of place-entities are provided to the user. As an example and not by way of limitation, if the user is sending a search input for a check-in using a typeahead feature, the top 7 place-entities corresponding to the search string already entered that remain after the suppression, deduplication, and best-page selection processes may be provided to the user. In particular embodiments, the top place-entities provided to a user may vary based on the redirection graph used and the suppression, deduplication, and best-page selection parameters used to generate the redirection graph. As an example and not by way of limitation, using a first redirection graph, place-entity A may redirect to place-entity B; using a second redirection graph, place-entity A may redirect to place-entity C; and using a third redirection graph, place-entity A may be suppressed.

In particular embodiments, redirection graphs may be personalized or adjusted to specific users or groups of users. As an example and not by way of limitation, users who are tourists to a particular region may generally visit popular places and may not be familiar with alternate names or abbreviations for places, while users who are locals may visit less well-known places and use alternate names or abbreviations more frequently. In particular embodiments, two separate redirection graphs may be generated; one for tourists and one for locals. In particular embodiments, one redirection graph may be used for both groups of users, but different thresholds may be applied to the suppression, duplication, and redirect scores within the graph. As an example and not by way of limitation, a tourist may have their threshold quality-score, duplication-score, and redirect-score adjusted to suppress a greater number of place-entity nodes and redirect more place-entity nodes to their respective canonical place-entity nodes.

In particular embodiments, A/B testing may be used to two or more redirection graphs in order to determine which graph performs better. As an example and not by way of limitation, two redirection graphs may be generated for the purposes of check-ins, using two different sets of input parameters for the suppression and deduplication processes. The two redirection graphs may be used with users and user responses may be measured in order to determine which redirection graph results in a better user experience. In particular embodiments, the A/B testing results may be used to improve generation of redirection graphs or to improve the selection of a redirection graph for a particular user. In particular embodiments, the A/B testing may be used to adjust threshold scores for the particular user or a group of users.

Figure 6:
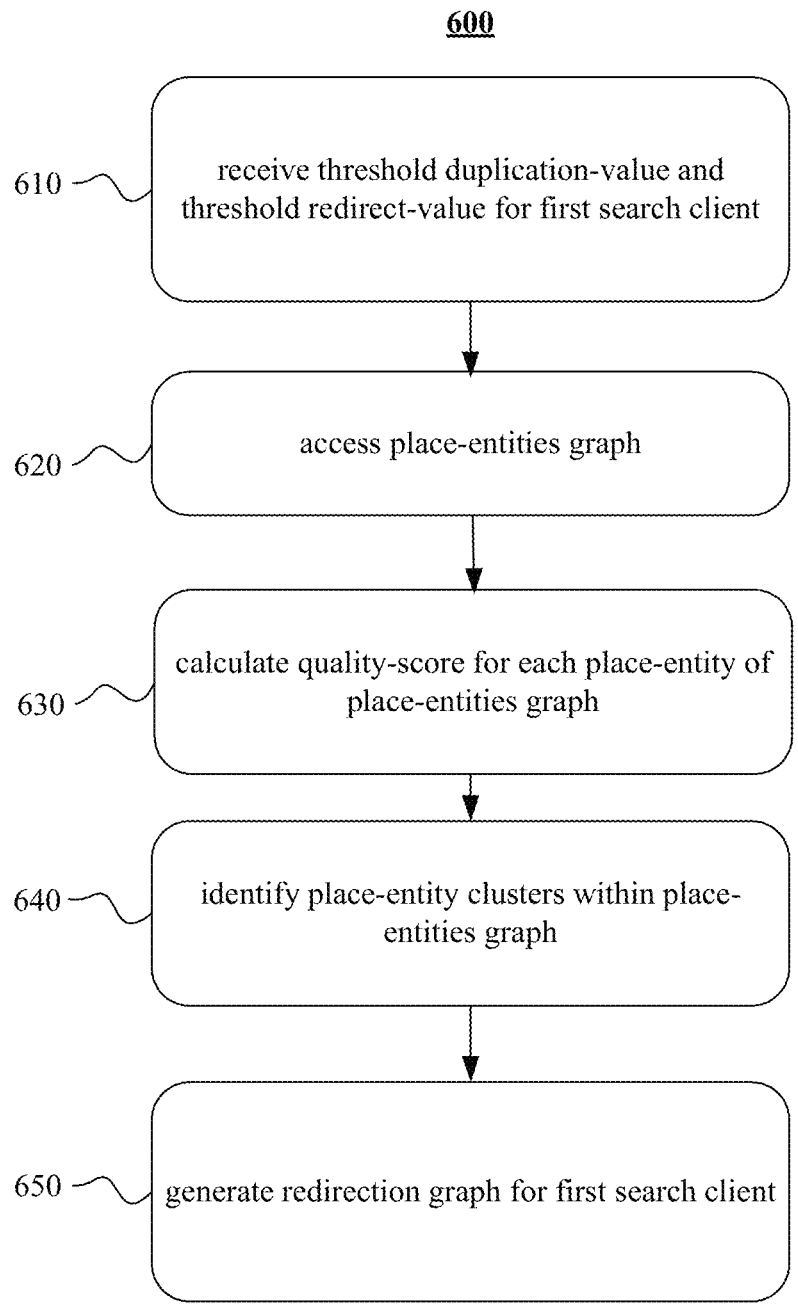
FIG. 6 illustrates an example method for generating a redirection graph.

FIG. 6 illustrates an example method 600 for generating a redirection graph. The method may begin at step 610, where social-networking system 160 may receive a threshold duplication-value and a threshold redirect-value from a search client. In particular embodiments, the search client may be one of a plurality of search clients of social-networking system 160. In particular embodiments, the threshold duplication-value and the threshold redirect-value may be associated with the search client. In particular embodiments, the threshold duplication-value may be a threshold to determine whether to cluster two or more place-entities based on the duplication-value for the place-entities. In particular embodiments, the threshold redirect-value may be a threshold to determine whether to redirect a place-entity to another place-entity in the same place-entity cluster. In particular embodiments, social-networking system 160 may also receive a threshold quality-score from the search client. In particular embodiments, the threshold quality-score may be a threshold to determine whether to suppress a particular place-entity so it does not appear as a search result.

At step 620, social-networking system 160 may access a place-entities graph. In particular embodiments, the place-entities graph comprises a plurality of place-entity nodes, each place-entity node representing a place-entity associated with a particular geographic location.

At step 630, social-networking system 160 may calculate a quality-score for each place-entity node of the plurality of place-entity nodes. In particular embodiments, the quality-score for a particular place-entity node may be based on one or more of: an accuracy of attributes of a place-entity associated with the place-entity node; a number of photos associated with the place-entity on social-networking system 160; an amount of content associated with the place-entity; a recency-value associated with the content or photos; or a number of social signals associated with the place-entity. In particular embodiments, social signals may include check-ins, likes, comments, views, or reviews of the place-entity provided by users of social-networking system 160.

At step 640, social-networking system 160 may identify place-entity clusters within the place-entities graph. In particular embodiments, each place-entity cluster may comprise place-entity nodes having duplication-values with respect to at least one other place-entity node in the place-entity cluster above the threshold duplication-value. In particular embodiments, the duplication-value for the place-entity node with respect to the other place-entity node may represent a likelihood that the two place-entity nodes each correspond to the same geographic location. In particular embodiments, a duplication-value may be calculated for each pair of place-entity nodes.

In particular embodiments, one of the place-entity nodes for a place-entity cluster may be selected as the canonical place-entity node, based at least in part on a duplication-value between the place-entity nodes of the place-entity cluster. In particular embodiments, selection of the canonical place-entity node may be based on a human reviewer's input, or through machine learning processes. In particular embodiments, the canonical place-entity node may be further based on the quality-scores for the place-entity nodes of the place-entity cluster. As an example and not by way of limitation, the canonical place-entity node may have the highest quality-score in the place-entity cluster.

At step 650, social-networking system 160 may generate a redirection graph for the search client. In particular embodiments, the redirection graph may be based on the place-entities graph, and may comprise the plurality of place-entity nodes and the identified place-entity clusters, wherein for each place-entity node in each place-entity cluster, a redirection edge may be established between the place-entity node and the respective canonical place-entity node for the place-entity cluster if the duplication-value for the place-entity node is greater than the threshold redirect-value. In particular embodiments, the threshold redirect-value may be adjusted based on how "canonical" or official the canonical place-entity node is in comparison to the other place-entity nodes in the cluster. In particular embodiments, the redirection graph may be filtered by removing one or more place-entity nodes having quality-scores below the threshold quality-score.

In particular embodiments, a user may send a search query via the search client to social-networking system 160, where the search query is associated with a particular place-entity node in a particular place-entity cluster having a particular place-entity node. If the particular place-entity node is connected to the particular canonical place-entity node by a redirection edge in the generated redirection graph, then the response to the search query may be a reference to the particular canonical place-entity node; else the response may be a reference to the particular place-entity node. In particular embodiments, social-networking system 160 may determine that the user is an administrator of the particular place-entity node or its corresponding page. If the user is an administrator of the particular place-entity node, and there is a redirection edge to the particular canonical place-entity node, social-networking system 160 may override the redirection edge and provide a response that is the particular place-entity node. In particular embodiments, if the particular place-entity node has a quality-score that is less than the threshold quality-score, the response to the search query may be a reference to the particular canonical place-entity node. In particular embodiments, the threshold duplication-value and the threshold redirect-value may be based on attributes of the user sending the search query.

In particular embodiments, social-networking system 160 may access a social graph of social-networking system 160 and determine a social-graph affinity for the user with respect to the particular place-entity node. If the user has a social-graph affinity greater than a threshold affinity, and the particular place-entity node is connected to the particular canonical place-entity node by a redirection edge, social-networking system 160 may override the redirection edge and send a reference to the particular place-entity node as the response to the user.

In particular embodiments, a user may send a search query via the search client to social-networking system 160. Social-networking system 160 may determine a plurality of place-entity nodes matching the search query within the redirection graph for the search client. In particular embodiments, the plurality of place-entity nodes may be ranked based on their respective quality-scores, and social-networking system 160 may send a set of results to the user comprising the place-entity nodes above a threshold ranking. In particular embodiments, if the user has social-graph affinity with one or more of the place-entity nodes greater than a threshold affinity, social-networking system 160 may boost the ranking of the one or more place-entity nodes.

Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for generating a redirection graph, including the particular steps of the method of FIG. 6, this disclosure contemplates any suitable method for generating a redirection graph including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Identification of Low-Quality Place-Entities

In particular embodiments, place-entities may be added to a database of social-networking system 160 from different sources. As an example and not by way of limitation, place-entities may be added from an external database, business owners, web crawlers, or from individual users. In particular embodiments, user-created place-entities may be input by users when they are at a particular geographic location. As an example and not by way of limitation, a particular user may be at the Golden Gate Bridge in San Francisco, Calif., and choose to add a place-entity to social-networking system 160 titled "Golden Gate Bridge." In particular embodiments, a user-created place may be associated with an existing place-entity node of social graph 200. As an example and not by way of limitation, continuing the example above, when the user inputs a place-entity with the title "Golden Gate Bridge", the user may link this place-entity to a place-entity node on social graph 200 called "Golden Gate Bridge". Social-networking system 160 may then associate the newly-added place-entity with this place-entity node. In particular embodiments, a user may not associate the newly-added place-entity with an existing place-entity node of social graph 200. As an example and not by way of limitation, if a user attempts to check-in while at Yankee Stadium in New York City, but does not associate the check-in place with the existing place-entity node "Yankee Stadium" on social-networking system 160, the newly added "Yankee Stadium" place-entity may not be associated with any place-entity nodes of social-networking system 160. As another example and not by way of limitation, a user may create: place-entities for private places such as their personal homes; non-place-entities such as organizations or online stores; events; or irregular names. As another example and not by way of limitation, a user may create a place-entity for their personal home, titled "home sweet home." This may be understood to not refer to any place-entity that is associated with an existing place-entity node on social-networking system 160. However, if the place-entity titled "Home Sweet Home" refers to a bar in New York City with the same name, social-networking system 160 may associate the place-entity with the place-entity node. In particular embodiments, if social-networking system 160 determined that there is no existing place-entity node for a newly-added place-entity, social-networking system 160 may create a new place-entity node for the new place-entity.

In particular embodiments, a large number of user-created place-entities may be added to social-networking system 160. However, because a lot of these user-created place-entities may be specific to the user who created them, their relative value to other users of social-networking system 160 may be low. As an example and not by way of limitation, if a first user enters a place during a check-in as "home sweet home," this place-entity is not relevant to a second user who lives elsewhere. In particular embodiments, these user-created place-entities and their corresponding place-entity nodes may be considered "junk nodes" of social graph 200. In particular embodiments, a large number of junk nodes may pose difficulties for several functionalities of social-networking system 160. As an example and not by way of limitation, a large number of junk nodes may provide a lot of irrelevant places to be considered for tasks such as a search for places, recommendation of places, or category detection of places. In particular embodiments, these tasks may require a high data quality of the places considered in order to be effective to the user. As an example and not by way of limitation, if a particular user performs a search for the bar "Home Sweet Home" in New York City, but there are 100 user-created place-entities by the same name in the area, the search results may be less valuable to the user.

In particular embodiments, determination of whether a particular place-entity node is a "junk node" may be based on the attributes of the particular place-entity. As an example and not by way of limitation, a first user may check-in through social-networking system 160 with the place named "on my coffee break." The geographic location of this check-in may be provided. As another example and not by way of limitation, when the user checks-in through a mobile device, the mobile device may also send its detected geographic location as part of the place-entity. In particular embodiments, social-networking system 160 may determine whether the location of the check-in is associated with an existing place based on the geographic location. If there is no place, or no places associated with a real business or point of interest, social-networking system 160 may determine that the place "on my coffee break" is of low quality.

In particular embodiments, social-networking system 160 may detect junk nodes through a binary classifier that receives a plurality of social signals through social-networking system 160. As an example and not by way of limitation, for a given place-entity node on the social graph 200, there may be a number of check-ins, likes, posts, comments or other user-interactions with the place-entity. In particular embodiments, a binary classifier may use the signals received for the particular place-entity node to predict whether the place-entity node corresponds to a public place-entity that other users may want to check-in to, or is a non-public, e.g. junk place-entity that is specific to a small group of users. As an example and not by way of limitation, if a particular place-entity receives a large number of check-ins from different users, social-networking system 160 may determine that the particular place-entity is a public place-entity. As another example and not by way of limitation, if a particular place-entity has a large number of check-ins but the corresponding geographic locations (e.g. latitude and longitude coordinates) are not centralized, then social-networking system 160 may determine that this place-entity does not correspond to a real, public place.

In particular embodiments, additional methods may be used to determine junk nodes. In particular embodiments, social-networking system 160 may build a "heterogeneous graph" that includes place-entity nodes, n-gram nodes, and user nodes. In particular embodiments, n-gram nodes may be based on n-grams derived from place entity names. As an example and not by way of limitation, the n-grams may be unigrams or bigrams. As another example and not by way of limitation, a place-entity titled "home sweet home" may have the following five n-grams associated with it: "home," "sweet," "home sweet," "sweet home," and "home sweet home." In particular embodiments, once the n-gram nodes are generated, each place-entity node may be connected by an edge to each of the associated n-grams. As an example and not by way of limitation, continuing the example above, the place-entities "home sweet home" and "Home Depot" may both have an edge to the "home" n-gram, while "Home Depot" lacks edges to the other n-grams of "home sweet home." In particular embodiments, user nodes corresponding to users of social-networking system 160 may be connected to place-entity nodes by edges that represent social signals. As an example and not by way of limitation, an edge may be created between a user node and a place-entity node if that user has check-ins, likes, comments, posts, views, reviews, or any other activity associated with the place-entity node. In particular embodiments, the heterogeneous graph may comprise place-entity nodes connected to n-gram nodes and user nodes.

Figure 7:
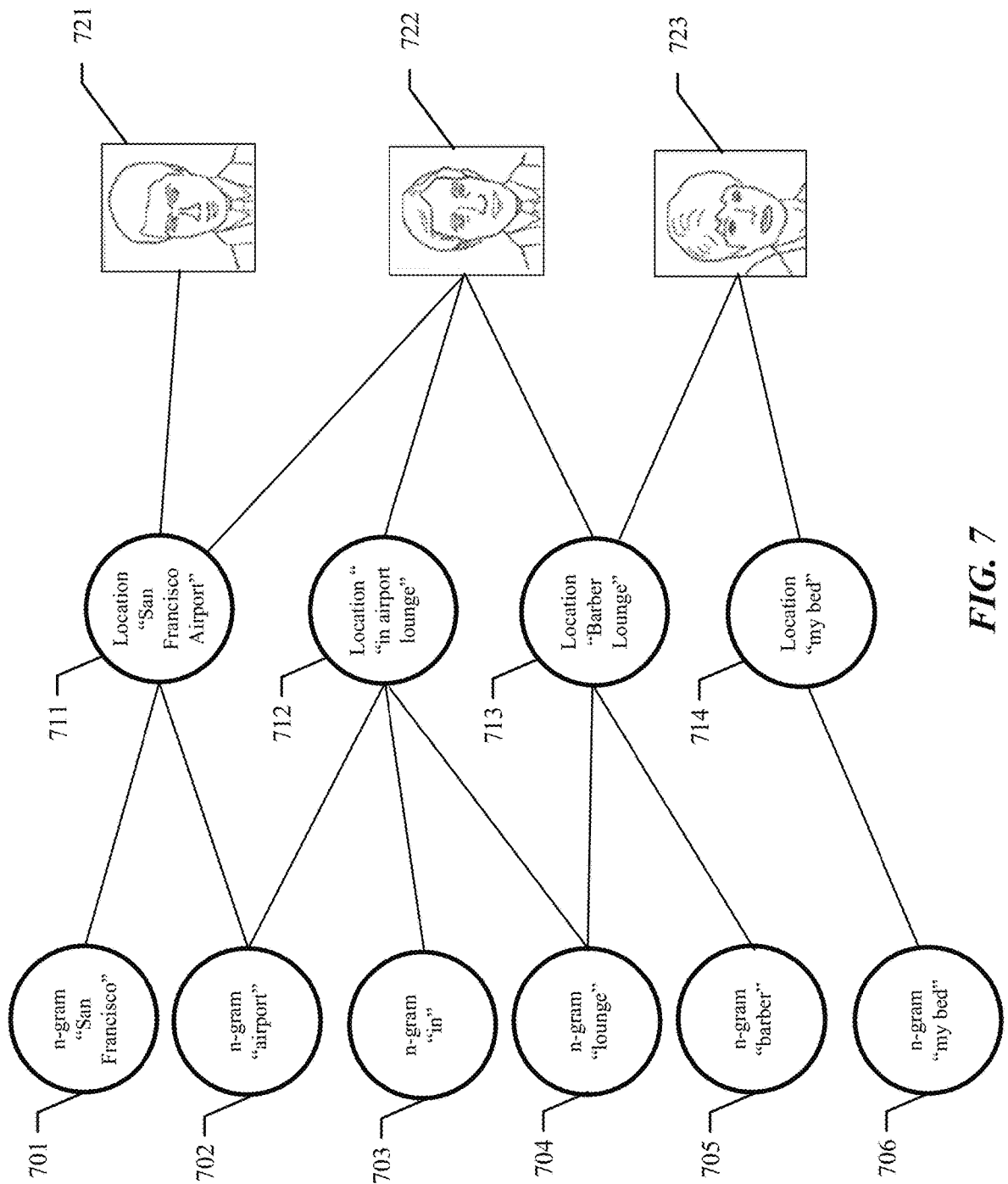
FIG. 7 illustrates an example heterogeneous graph.

FIG. 7 depicts an example heterogeneous graph. The heterogeneous graph may include a number of n-gram nodes 701-706 corresponding to n-grams; a number of place-entity nodes 711-714 corresponding to place-entities; and user nodes 721-723 corresponding to users. In the example of FIG. 7, user nodes 721-723 may be connected to one or more of the place-entity nodes with which they have been associated. In the example of FIG. 7, user 721 may have a check-in at place-entity node 711 "San Francisco Airport." User 722 may have a review of place-entity node 711 "San Francisco Airport," a check-in at place-entity node 712 "in airport lounge," and liked a page of place-entity node 713 "Barber Lounge." User 723 may have a review of place-entity node 713 "Barber Lounge," and a check-in at place-entity node 714 "my bed." The heterogeneous graph may create connections between each user node and the place-entities with which the user has a social signal, as depicted in FIG. 7. In the example of FIG. 7, the place-entity nodes 711-714 may also be connected to one or more n-gram nodes corresponding to the n-grams corresponding to the place-entity names. In the example of FIG. 7, place-entity node 711 "San Francisco Airport" may be connected to n-gram node 701 "San Francisco" and n-gram node 702 "airport." Place-entity node 712 "in airport lounge" may be connected to n-gram node 702 "airport," n-gram node 703 "in," and n-gram node 704 "lounge." Place-entity node 713 "Barber Lounge" may be connected to n-gram node 704 "lounge" and n-gram node 705 "barber." Place-entity 714 "my bed" may be connected to n-gram node 706 "my bed."

In particular embodiments, once the heterogeneous graph is constructed, social-networking system 160 may assign initial (or "seed") scores to a set of place-entity nodes that are known to be high-quality or low-quality. As an example and not by way of limitation, known high-quality place-entity nodes may be labeled with an initial score of +1, and known low-quality place-entity nodes may be labeled with an initial score of −1. In particular embodiments, the initial labeling may be provided by other scoring algorithms, from human evaluators, or through user feedback. As an example and not by way of limitation, user feedback may comprise presenting a particular place-entity to a user and asking the user to determine if the place-entity is high-quality or low-quality.

In particular embodiments, a label-propagation approach may be used to propagate the scores from one node to another through the graph edges of the heterogeneous graph. As an example and not by way of limitation, the score for a particular n-gram may be determined by averaging the scores for all of the place-entity nodes directed connected to the n-gram node corresponding to the particular n-gram. In particular embodiments, the scores for new place-entity nodes may be calculated based on the scores for the n-gram and user nodes connecting to the place-entity node. In particular embodiments, in each iteration of the label-propagation algorithm, each node may take the scores from its direct neighbors. In particular embodiments, the scores may be weighed by a weight factor assigned to each edge from the direct neighbors to the node. An average of the scores may be taken to obtain an updated score for the node. The label-propagation algorithm may be iterated until the scores for the nodes converge to stable values. In particular embodiments, once the scores have been stabilized, each place-entity may have a score ranging from the initial minimum value to the initial maximum value. As an example and not by way of limitation, the final quality-scores may range from −1 to +1 which may represent a measure of the quality of the node. In particular embodiments, a threshold score may be used to determine if a place-entity node is high-quality or low-quality. As an example and not by way of limitation, all place-entity nodes with a score below 0.5 may be determined "junk" nodes, while all place-entity nodes with scores above 0.5 may be deemed high-quality nodes.

In particular embodiments, the n-gram nodes corresponding to n-grams may represent a similarity between place-entities. Place-entities that share a direct connection with a particular n-gram node may be considered to have some amount of similarity. As an example and not by way of limitation, place-entities "Home Depot" and "home sweet home" may be considered to have some similarity due to the shared n-gram node "home." In particular embodiments, the n-gram "home" may have an overall negative association. In other words, social-networking system 160 may determine that most place-entity nodes with a connection to the "home" n-gram node may have low scores. Meanwhile, the n-gram "depot" may have an overall positive association, as most place-entity nodes with a connection to "depot" may have higher scores. In particular embodiments, a particular place-entity node may be designated high-quality due to the relative strength of the associated n-grams. As an example and not by way of limitation, for the place-entity node "Home Depot," the positive effect from the n-gram "depot" may be greater than the negative effect from the n-gram "home." As another example, the place-entity node "home sweet home" may be deemed low-quality due to the negative effects of its n-grams.

In particular embodiments, an original identification of an initial place-entity as low-quality (−1) or high-quality (+1) may be reversed. As an example and not by way of limitation, a place-entity may have originally been designated low-quality, but after label-propagation, the place-entity may be deemed high-quality. The label-propagation algorithm may then change the initial score for the place-entity node to +1.

Figure 8:
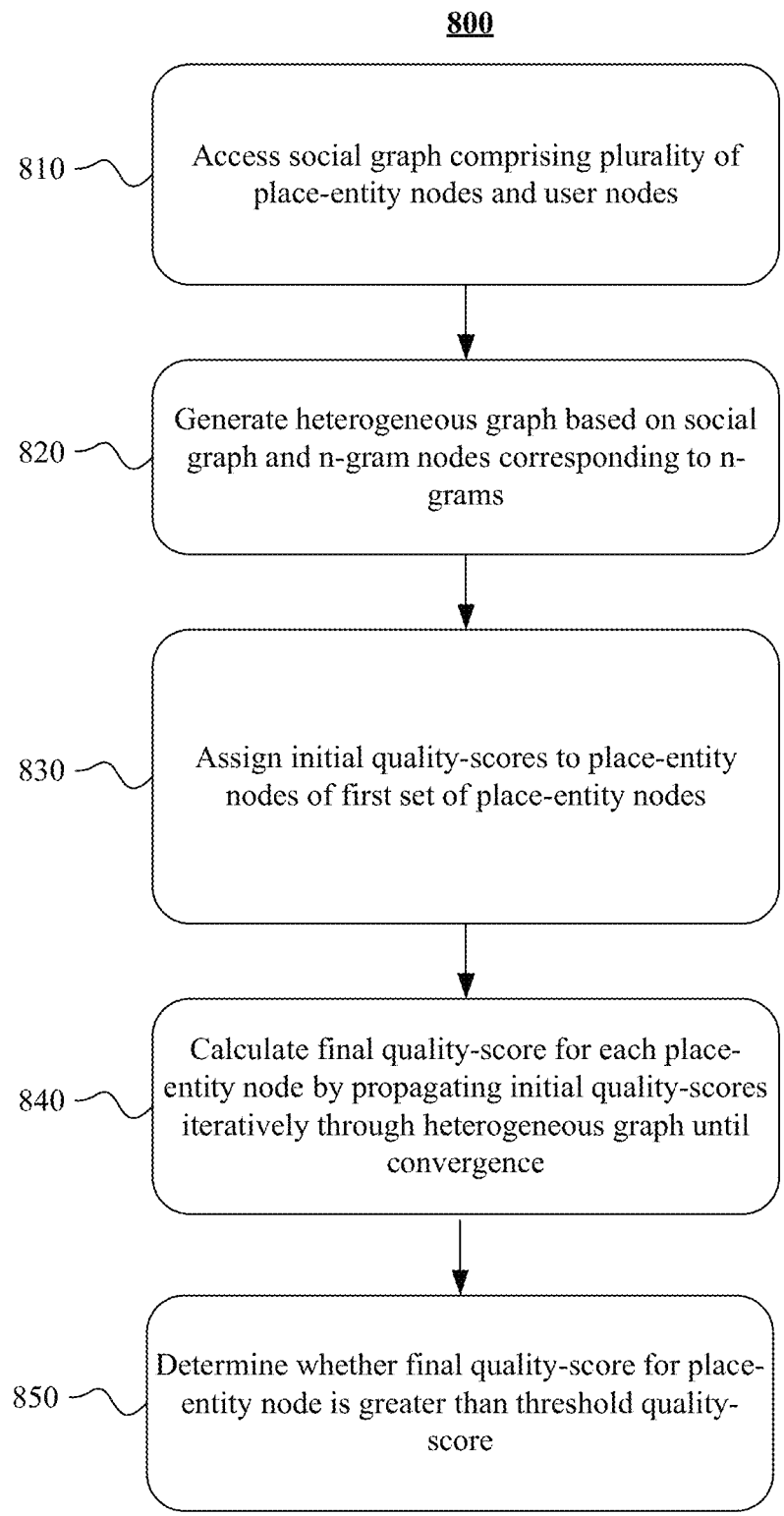
FIG. 8 illustrates an example method for suppressing entity suggestions.

FIG. 8 illustrates an example method 800 for generating a heterogeneous graph and calculating quality-scores for place-entity nodes through label propagation. The method may begin at step 810, where social-networking system 160 may access a social graph comprising a number of nodes and a number of edges connecting the nodes. In particular embodiments, each edge between two nodes may establish a single degree of separation between them. In particular embodiments, the nodes may include a number of place-entity nodes corresponding to place-entities, where each place-entity is associated with a particular geographic location, and user nodes corresponding to users of social-networking system 160. In particular embodiments, the place-entity nodes may be associated with one or more n-grams based on the place name of the place-entity node. In particular embodiments, the n-grams may comprise unigrams and bigrams At step 820, social-networking system 160 may generate a heterogeneous graph based on the nodes and edges of the social graph, and a number of n-gram nodes, each n-gram node corresponding to an n-gram. In particular embodiments, each place-entity node may be connected by one or more edges to each n-gram node corresponding to an n-gram within the place name of the place-entity. In particular embodiments, each place-entity node may also be connected by one or more edges to one or more user nodes, where each edge between a user node and a place-entity node represents a social-networking interaction by the user corresponding to the user node with the place-entity corresponding to the place-entity node. In particular embodiments, social-networking interactions may include check-ins, likes, comments, views, or reviews of a place-entity corresponding to the place-entity node.

At step 830, social-networking system 160 may assign initial quality-scores to one or more place-entity nodes of a first set of place-entity nodes. In particular embodiments, the initial quality-score for each place-entity node may represent a measure of quality of the place-entity node. In particular embodiments, the initial quality-score for each place-entity node may be based on the social-networking interactions represented by the one or more edges connected to the place-entity node. In particular embodiments, a maximum quality-score may be assigned to a place-entity node known to be a valid place-entity node, while a minimum quality-score may be assigned to a place-entity node known to be a junk place-entity node.

At step 840, social-networking system 160 may calculate a final quality-score for each place-entity node of the heterogeneous graph by propagating the initial quality-scores through the heterogeneous graph iteratively until the quality-scores reach convergence. In particular embodiments, the iterative propagation may be a label-propagation algorithm performed on the heterogeneous graph. For each iteration of the propagation process, an n-gram-node score may be calculated for each n-gram node connected to one or more place-entity nodes having an associated quality-score. In particular embodiments, a user-node score may also be calculated for each user node connected to one or more place-entity nodes having an associated quality-score. For each place-entity node connected to one or more n-gram nodes having an associated n-gram-node score and one or more user nodes having an associated user-node score, a quality-score may be calculated based on the associated n-gram-node scores and user-node scores of the n-gram and user nodes connected to the place-entity node. In particular embodiments, if quality-scores associated with the place-entity nodes of the heterogeneous graph have converged, then the iterative propagation may end; if the quality-scores have not converged, then the iterative propagation may continue with another iteration. In particular embodiments, for each iteration, the n-gram-node score for a particular n-gram node may be calculated by averaging the associated quality-scores of the place-entity nodes connected to the n-gram node. In particular embodiments, for each iteration, the user-node score for a particular user node may be calculated by averaging the associated quality-scores of the place-entity nodes connected to the user node. In particular embodiments, for each iteration, the quality-score may be calculated by averaging the associated n-gram-node scores and user-node scores of the n-gram and user nodes connected to the place-entity node. In particular embodiments, determining whether the quality-scores have converged through the iterative propagation may be based on determining that for all nodes of the heterogeneous graph, the sum of associated quality-scores, n-gram-node scores, and user-node scores between two consecutive iterations vary by less than a threshold value.

At step 850, social-networking system 160 may determine whether the final quality-score for a particular place-entity node is greater than a threshold quality-score. In particular embodiments, if the final quality-score is greater than the threshold quality-score, the place-entity node may be identified as a valid place-entity node. In particular embodiments, if the final quality-score is less than the threshold quality-score, then the place-entity node may be identified as a junk place-identify node. In particular embodiments, social-networking system 160 may remove from the heterogeneous graph each place-entity node having a final quality-score below the threshold quality score.

In particular embodiments, a user may send a search query associated with a particular place-entity node of the heterogeneous graph to social-networking system 160. The particular place-entity node may be also associated with a canonical place-entity node. Social-networking system 160 may determine whether the particular place-entity node has a final quality-score less than the threshold quality-score. If the final quality-score is less than the threshold quality-score, then social-networking system 160 may send a response comprising a reference to the canonical place-entity node to the user. If the final quality-score is greater than the threshold quality-score, then social-networking system 160 may send a response comprising a reference to the particular place-entity node. In particular embodiments, a search query may be associated with multiple place-entity nodes, Social-networking system 160 may rank the multiple place-entity nodes by their respective final quality-scores, and send references to each place-entity node having a ranking greater than a threshold ranking. In particular embodiments, the ranking of a particular place-entity node may be boosted if the user has a social-graph affinity with the particular place-entity node greater than a threshold affinity.

Particular embodiments may repeat one or more steps of the method of FIG. 8, where appropriate. Although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates an example method for generating a heterogeneous graph and calculating quality-scores for place-entity nodes, including the particular steps of the method of FIG. 8, this disclosure contemplates any suitable method for generating a heterogeneous graph and calculating quality-scores for place-entity nodes including any suitable steps, which may include all, some, or none of the steps of the method of FIG. 8, where appropriate. Furthermore, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8.

Figure 9A:
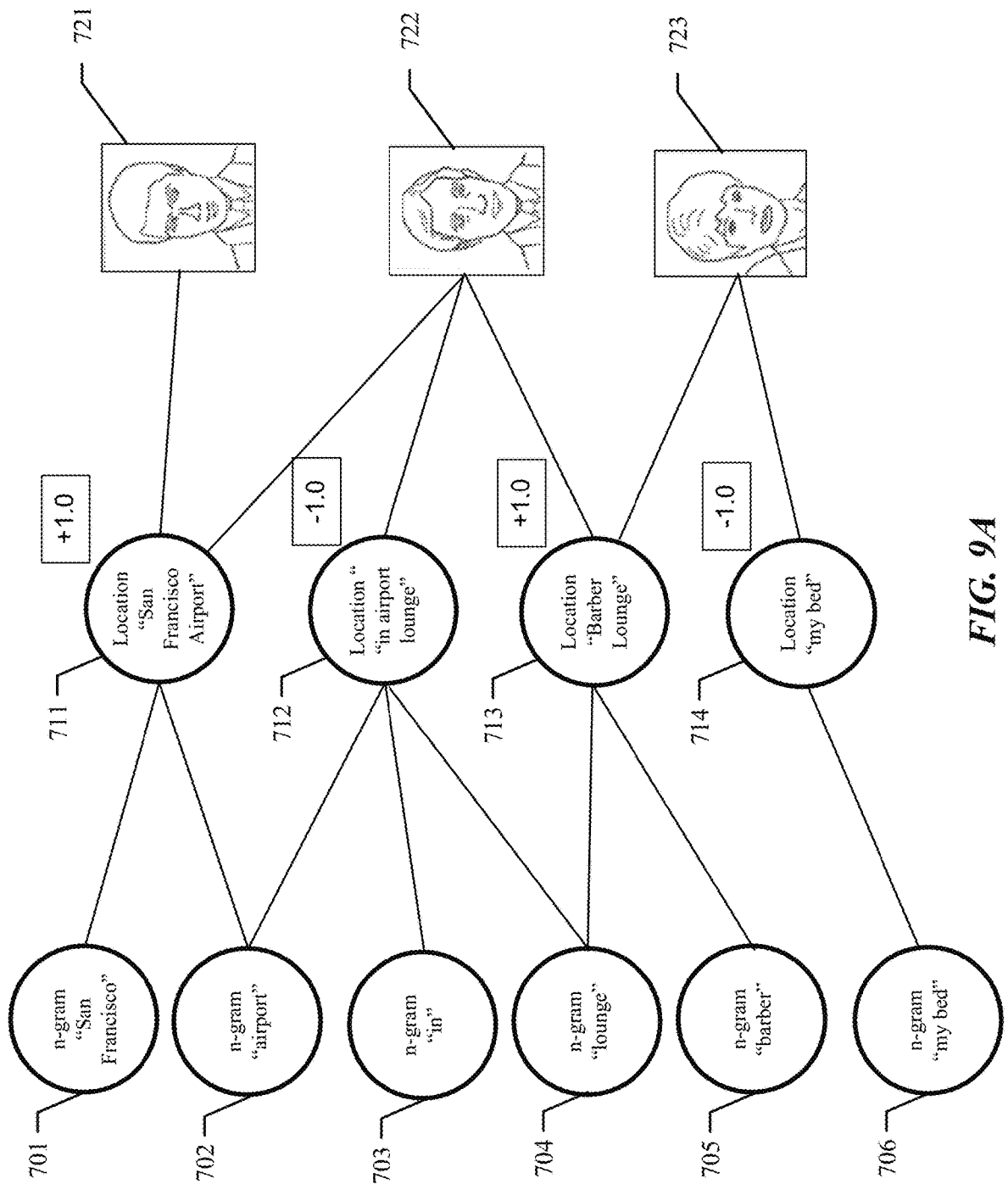
FIG. 9A-9D illustrate an example of iterative propagation of scores through a heterogeneous graph.
Figure 9B:
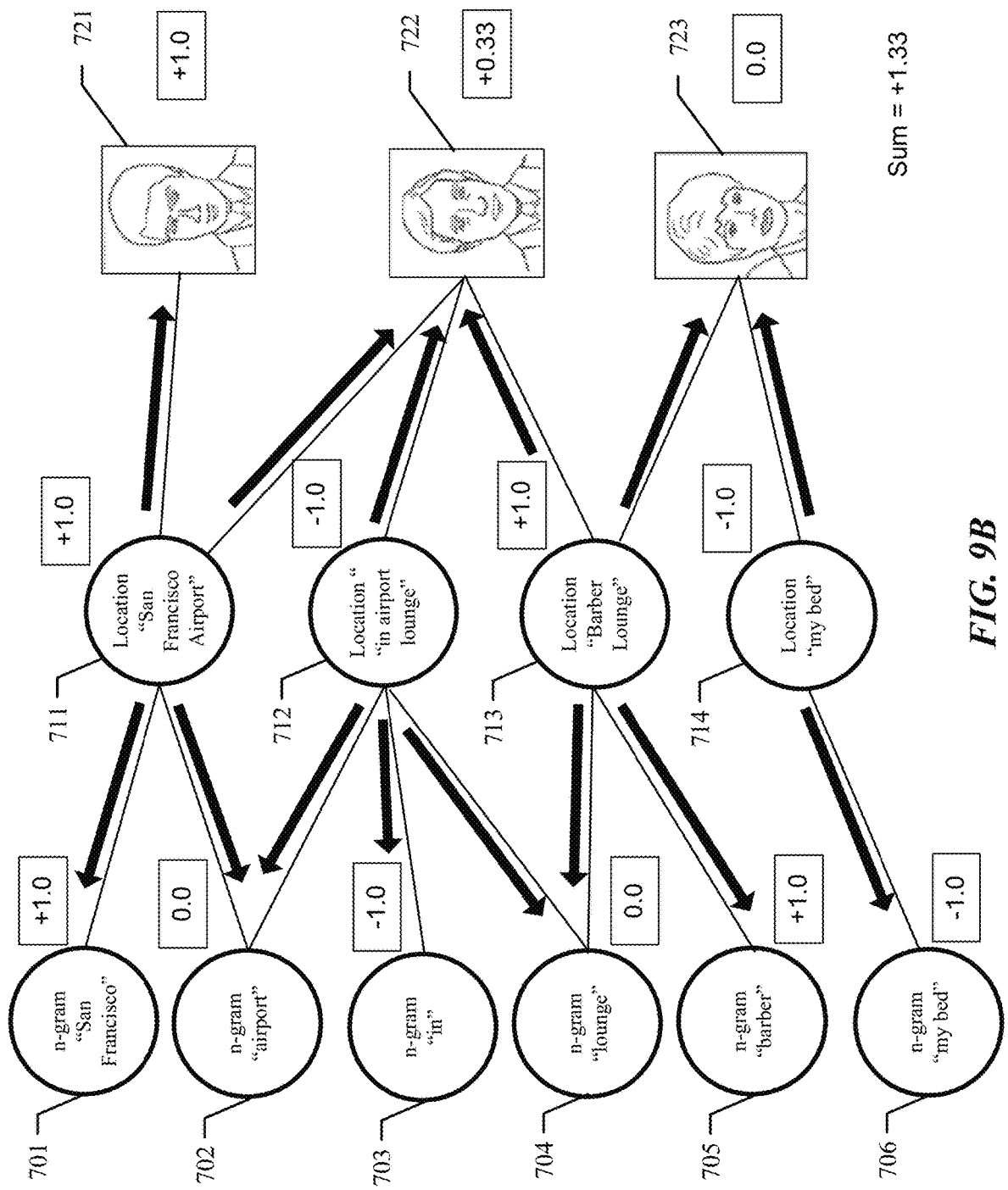

FIGS. 9A-9D illustrates an example of an iteration of the iterative propagation process for a heterogeneous graph. In FIG. 9A, initial seed scores may be assigned to place-entity nodes 711-714. Place-entity nodes 711 and 713 may be given an initial seed score of +1.0, while place-entity nodes 712 and 714 may be assigned an initial seed score of −1.0. In FIG. 9B, the initial scores may be used to propagate scores to n-gram nodes 701-706 and user nodes 721-723. The score for each n-gram or user node may be calculated as an average of the scores of the place-entity nodes connected to the n-gram or user node. As an example and not by way of limitation, n-gram node 701, only connected to place-entity node 711, may have a score of +1.0. N-gram node 702, which is connected to place-entity nodes 711 and 712, may average the respective scores to have a score of 0.0. N-gram node 703 may be only connected to place-entity node 712, and may receive a score of −1.0. N-gram node 704 may be connected to place-entity nodes 712 and 713, and may receive a score of 0.0. N-gram node 705 may be connected only to place-entity node 713, and may receive a score of +1.0. N-gram node 706 may be connected only to place-entity node 714, and may receive a score of −1.0. User node 721 may be connected only to place-entity node 711, and may receive a score of +1.0. User node 722 may be connected to place-entity nodes 711, 712, and 713, and receive a score of +0.33. User node 723 may be connected to place-entity nodes 713 and 714, and receive a score of 0.0. Summing all quality-scores, n-gram-node scores, and user-node scores in the example of FIG. 9B may result in a total score of +1.33.

Figure 9C:
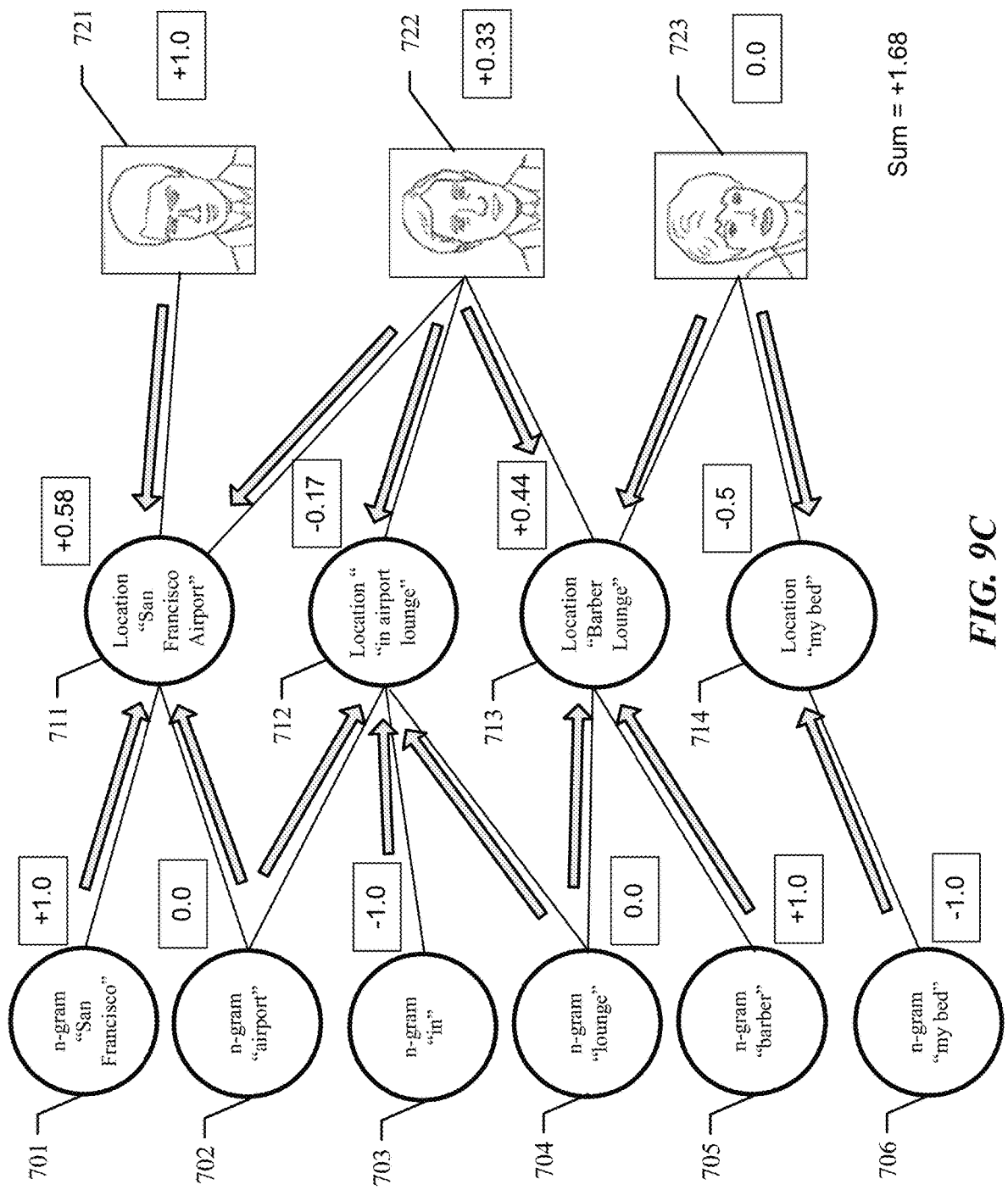

In the example of FIG. 9C, the scores associated with the n-gram and user nodes may be propagated back to the place-entity nodes to update quality-scores for the place-entity nodes. In the example of FIG. 9C, Place-entity node 711 may receive an average of the scores for n-gram nodes 701 and 702 and user nodes 721 and 722, resulting in a score of +0.58. Place-entity node 712 may be connected to n-gram nodes 702, 703, and 704, and user node 722, and receives an average of their respective scores, or −0.17. Place-entity node 713 may be connected to n-gram nodes 704 and 705, and user nodes 722-723, and receives the average of their respective scores for a score of +0.44. Place-entity node 714 may be connected to n-gram node 706 and user node 723, and receives a score of −0.5. In the example of FIG. 9C, the sum of all scores may now be +1.68.

Figure 9D:
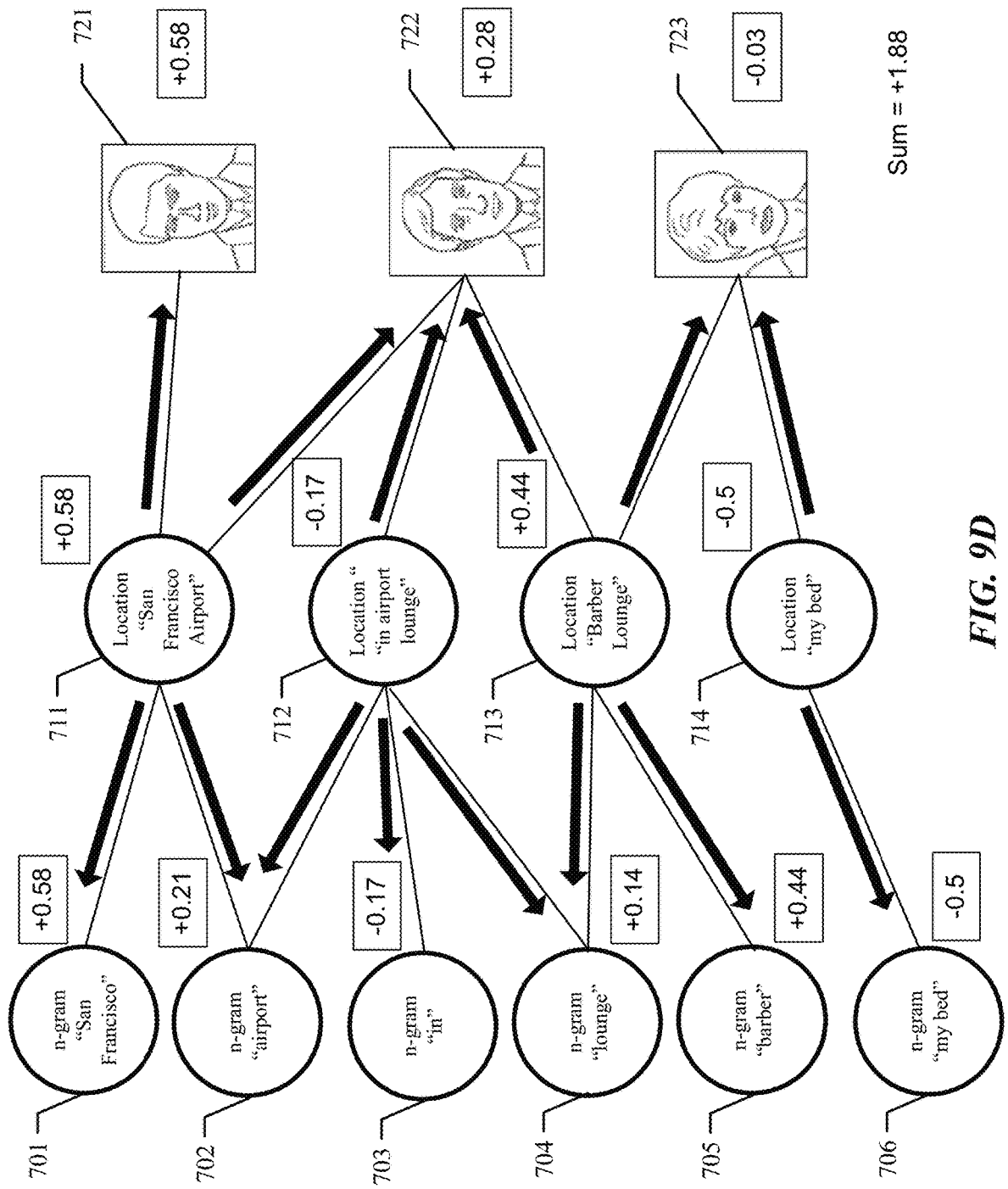

In the example of FIG. 9D, the n-gram-node scores and user-node scores may be iteratively updated based on the updated scores for place-entity nodes 711-714. Using the same node relationships discussed above for FIG. 9B, n-gram node 701 may now have a score of +0.58; n-gram node 702 may have a score of +0.21; n-gram node 703 may have a score of −0.17; n-gram node 704 may have a score of +0.14; n-gram node 705 may have a score of +0.44; and n-gram node 706 may have an updated score of −0.5. User node 721 may have an updated score of +0.58; user node 722 may have a score of +0.28; and user node 723 may have a score of +0.03. The sum of all scores in FIG. 9D may now be +1.88.

In particular embodiments, this process may be iteratively continued until the sum of all quality-scores, n-gram-node scores, and user-node scores reach convergence. As an example and not by way of limitation, the iterative propagation may be terminated when the variation between scores of all nodes in the heterogeneous graph for consecutive iterations is less than a threshold value. In the example of FIGS. 9A-9D, the full iteration of score propagation between FIGS. 9B and 9D results in a score difference of 0.55, which may be above a threshold value for determining that convergence has been reached.

In particular embodiments, for a particular place-entity node, social-networking system 160 may determine basic features from place names, attributes, and locations. As an example and not by way of limitation, place names may determine features such as n-grams, e.g. unigrams or bigrams; a number of tokens, letters, spaces, symbols, or uppercase letters; or whether the name is a year, starts with a number, contains an emoticon, or refers to a website. As another example and not by way of limitation, attributes of the place-entity nodes may include whether the place-entity has a phone number, language, website, address, alias, country, or zip code; whether the place-entity is from a Wikipedia page or an owned page; a total number of fans of the place-entity node; or a number of days from creation of the place-entity node. As an example and not by way of limitation, the location of a place-entity node may be used to determine a number of place-entity nodes and a number of owned place-entity nodes (e.g. place-entities from an owned page) that have the same physical location as a particular place-entity node. The total number of place-entity nodes, the number of owned place-entity nodes, and a ratio of owned place-entity nodes to total place-entity nodes may be used as features. In particular embodiments, a binary feature may be implemented to determine whether the total number of place-entity nodes exceeds a threshold count.

In particular embodiments, anomalous language characteristics may be determined by comparing place names associated with high-quality place-entity nodes with place names associated with low-quality place-entity nodes. In particular embodiments, the comparison may include comparing two trigram language models, one trained from low-quality place names and one trained from high-quality place names.

In particular embodiments, social features may be used to determine whether a place-entity node is high-quality or low-quality. As an example and not by way of limitation, social features may include: a number of distinct users of social-networking system 160 who have checked-in or have been tagged with the place-entity node; the number of days without any check-ins to the place-entity; and a percentage of non-local check-in users. In particular embodiments, demographic of check-in users may provide additional information. As an example and not by way of limitation, if the users who have checked-in at a place-entity comprise users with a wide demographic distribution, the place-entity is likely to correspond to a high-quality place-entity node.

Identification of Real-Best-Pages

In particular embodiments, a "real best page", may be a node or page that is determined to be the best-quality node or page for a set of nodes or a set of pages. In particular embodiments, a real best page may also be referred to as a search-log best page. In particular embodiments, the set of nodes or pages may share a common connection to a particular entity. As an example and not by way of limitation, for a particular sports team, there may be numerous pages related to the sports team on social-networking system 160, including fan pages, news reports, fan groups, player pages, or the team's official page. For this particular set of pages relating to the sports team entity, the real best page may be the team's official page. In particular embodiments, place-entities may be associated with a number of place-entity nodes. As an example and not by way of limitation, social-networking system 160 may have a number of place-entity nodes referring to New York City.

In particular embodiments, the real best page may be identified by a human operator or an intelligent algorithm. As an example and not by way of limitation, a human evaluator may be presented with six top-scoring nodes relating to a particular place-entity, and asked to select one of the nodes which is the most representative of the particular place-entity. The selected node may then become the real best page that corresponds to the particular place-entity.

In particular embodiments, a scoring algorithm of social-networking system 160 may predict the "best page" for a set of nodes, wherein the best page is the top-scoring node from the set of nodes. In particular embodiments, the selection of the "best page" may be based on factors such as the associated quality-score, number of social-networking interactions with the page, the language used in the page, or other metrics regarding the page. In particular embodiments, the best page and the real best page may be identical. In particular embodiments, due to imperfections in the social graph or place-entities graph, the best page and the real best page may be different.

The quality of a particular cluster of nodes of the social graph may be indicated by the metrics of precision and recall. Precision, as used herein, may refer to the fraction of nodes within a cluster that are correctly included in the cluster. As an example and not by way of limitation, if every node in a cluster refers to the same place-entity, the cluster may have 100% precision. Recall, as used herein, may represent the fraction of relevant nodes that are included in the cluster. As an example and not by way of limitation, if only half of the nodes that refer to a particular place-entity are included in the cluster, then the cluster may only have 50% recall.

In particular embodiments, the quality of the place-entities graph may be determined by measuring the precision and recall of one or more clusters. In particular embodiments, each node in a set of sample nodes may be labeled with its real best page. In particular embodiments, every node is a cluster may be evaluated. However, such a method may be computationally inefficient for a large number of nodes and clusters.

In particular embodiments, for each place-entity node in a set of place-entity nodes, the best representation of that place-entity node may be determined from among all duplicates of that place-entity node. The best representation may be the real best page, or a canonical place-entity node. As an example and not by way of limitation, if a user creates a page on social-networking system 160 via a check-in at a place-entity to create a particular place-entity node, but there is an official page in the place-entities graph for the place-entity, then social-networking system 160 may designate the place-entity node of the official page as the canonical place-entity node for the user's check-in. In particular embodiments, once every place-entity node in the set of place-entity nodes is labeled with its respective canonical place-entity node, the precision and recall of the place-entity nodes may be measured. As discussed above, associating place-entity nodes with their respective canonical place-entity nodes may be used for creating a redirection graph for place-entity nodes.

In particular embodiments, labeling place-entity nodes may include assigning an initial cluster-score for each place-entity node, based on a class of the place-entity node. In particular embodiments, the class may be the source of the place-entity node or the type of page on social-networking system 160 corresponding to the place-entity node. Classes of place-entity nodes deemed to be of higher quality may be assigned a greater initial cluster-score. As an example and not by way of limitation, an authentic or official page of social-networking system 160 for a place-entity may be assigned an initial cluster-score of 32000. As another example and not by way of limitation, a page from a reliable external website relating to a place-entity may be assigned an initial cluster-score of 16000. As another example and not by way of limitation, an unowned page associated with the place-entity may be assigned an initial cluster-score of 8000.

In particular embodiments, the initial cluster-scores may be adjusted based on one or more social signals associated with each place-entity node. As an example and not by way of limitation, the cluster-scores may be adjusted based on a number of check-ins, posts, likes, comments, views or reviews of a place-entity associated with the place-entity node. By adjusting the initial cluster-scores of the place-entity nodes, a tiebreaker may be provided for pages within the same class. As an example and not by way of limitation, if there are two place-entity nodes from official pages, one from "New York City" and a second from "Borough of Manhattan," but the "New York City" place-entity node is associated with more social signals, the cluster-score for "New York City" may be higher than the cluster-score for "Borough of Manhattan." In particular embodiments, candidate pages with higher cluster-scores than a threshold cluster-score may be identified. In particular embodiments, the candidate pages, or a subset of the candidate pages, may be presented to a human evaluator or an intelligent algorithm to identify the top-scoring page that best represents the place-entity. The place-entity node corresponding to the top-scoring page may be determined to be the canonical place-entity node for the place-entity cluster of place-entity nodes associated with the place-entity. In particular embodiments, a redirection graph may be updated to redirect all nodes in the cluster from an initial canonical place-entity node to the new canonical place-entity node.

In particular embodiments, the process of labeling place-entity nodes may not be done for each place-entity node in the redirection graph. As an example and not by way of limitation, if a redirection graph has hundreds of millions or billions of nodes, it may be computationally intensive to perform this process for each and every place-entity node. In particular embodiments, a subset of the redirection graph may be labeled and used to estimate the overall quality of the redirection graph. In particular embodiments, the subset of place-entity nodes may be selected randomly. In particular embodiments, to prevent low-quality or less-visited pages from overly affecting the evaluation of the redirection graph, the subset of nodes may be selected by applying weights to the place-entity nodes. In particular embodiments, the weighting may be based on a variety of social signals associated with the place-entity node. As an example and not by way of limitation, a page with more likes, comments, views, or reviews of the place-entity associated with the place-entity node may be selected for the subset over a page with fewer social signals. In particular embodiments, the weighting may be based on a viewer-entity-pair (VEP) value for a place-entity node. The VEP value may represent the number of distinct users who have viewed the page of the place-entity node. By weighting place-entity nodes based on usage or frequency of social signals, pages that are more popular may be given greater weight and have a higher chance of being selecting for labeling. In particular embodiments, this weighting process may focus on improving place-entities that are more popular in the place-entities graph.

Figure 10:
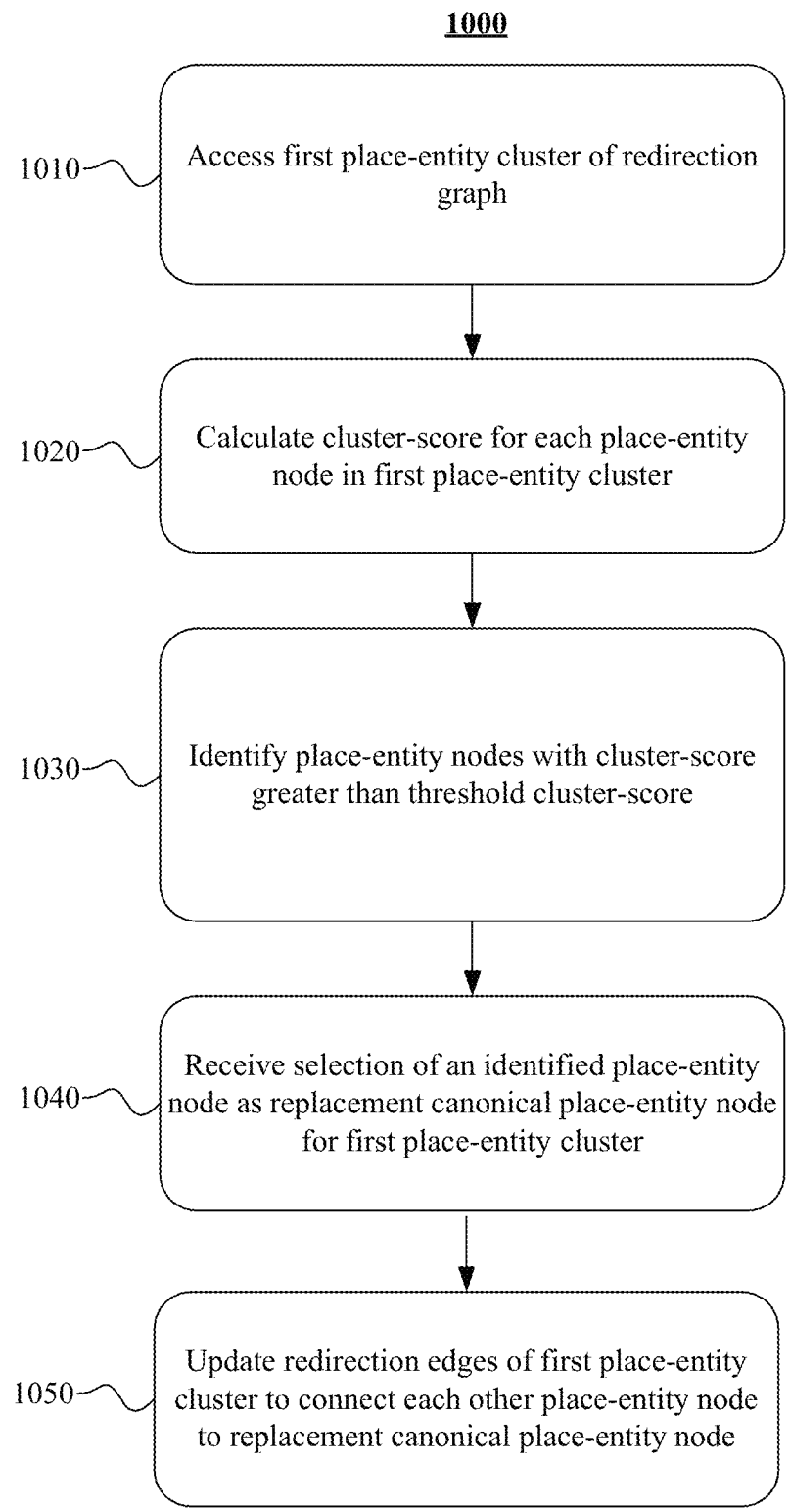
FIG. 10 illustrates an example method for ranking place-entities.

FIG. 10 illustrates an example method 1000 for determining a canonical place-entity node for a first place-entity cluster. The method may begin at step 1010, where social-networking system 160 may access a first place-entity cluster of a redirection graph. In particular embodiments, the first place-entity cluster may include a number of place-entity nodes, including an initial canonical place-entity node for the cluster. In particular embodiments, each other place-entity node in the first place-entity cluster may be connected to the initial canonical place-entity node by a redirection edge. In particular embodiments, the first place-entity cluster may be selected based on a number of social signals associated with the place-entity nodes of the first place-entity cluster. This method of selecting a place-entity cluster may improve the chances that place-entity nodes and clusters that are already high-quality are being evaluated. In particular embodiments, selecting the first place-entity cluster may be based on a viewer-entity-pair value for a page associated with a place-entity node of the first place-entity cluster.

At step 1020, social-networking system 160 may calculate a cluster-score for each place-entity node in the first place-entity cluster. In particular embodiments, an initial cluster-score for each place-entity node may be based on a class of the place-entity node. In particular embodiments, the initial cluster-score may be adjusted based on a number of social signals associated with the place-entity node to calculate the cluster-score. In particular embodiments, social signals may include check-ins, likes, comments, posts, views, or reviews of a place-entity associated with the place-entity node.

At step 1030, social-networking system 160 may identify place-entity nodes with a cluster-score greater than a threshold cluster-score. At step 1040, social-networking system 160 may receive a selection of an identified place-entity node as a replacement canonical place-entity node for the first place-entity cluster. In particular embodiments, if the replacement canonical place-entity node is different from the initial canonical place-entity node, then the first place-entity cluster may be updated by redefining the first place-entity cluster to add additional place-entity nodes of the redirection graph, each additional place-entity node having a duplication-value with respect to the replacement canonical place-entity node greater than a threshold duplication value. In particular embodiments, the first place-entity cluster may be redefined to remove at least one place-entity node from the first place-entity cluster, where each removed place-entity node has a duplication-value with respect to the replacement canonical place-entity node that is less than or equal to the threshold duplication-value.

At step 1050, social-networking system 160 may update the redirection edges of the first place-entity cluster to connect each of the other place-entity nodes to the replacement canonical place-entity node. In particular embodiments, the redirection edges may be updated by removing the redirection edges from each other place-entity node of the first place-entity cluster and the initial canonical place-entity node, and adding redirection edges between each other place-entity node to the replacement canonical place-entity node.

In particular embodiments, a quality-metric for the first place-entity cluster may be determined based on a precision-value or a recall-value for the first place-entity cluster. In particular embodiments, the precision-value may be calculated using the formula $(N_O - N_R)/N_O$, where $N_O$ is a number of place-entity nodes initially included the first place-entity cluster, and $N_R$ is a number of place-entity nodes removed from the first place-entity cluster when it is updated. In particular embodiments, the recall-value may be calculated using the formula $(N_O - N_R)/(N_O - N_R + N_A)$, wherein $N_O$ is a number of place-entity nodes initially included the first place-entity cluster, $N_R$ is a number of place-entity nodes removed from the first place-entity cluster when it is updated, and $N_A$ is a number of place-entity nodes added to the first place-entity cluster when it is updated. In particular embodiments, the quality-metric may be based on whether the initial canonical place-entity node is different from the replacement canonical place-entity node. In particular embodiments, the one or more place-entity nodes having a cluster-score greater than the threshold cluster-score may be provided to a client system of a user of social-networking system 160, and the user may select one of the place-entity nodes as the replacement canonical place-entity node. In particular embodiments, selecting an identified place-entity node as the replacement canonical place-entity node may be based on the cluster-score of the selected place-entity node. In particular embodiments, the identified one or more place-entity nodes having a cluster-score greater than the threshold cluster-score may include the initial canonical place-entity node.

Particular embodiments may repeat one or more steps of the method of FIG. 10, where appropriate. Although this disclosure describes and illustrates particular steps of the method of FIG. 10 as occurring in a particular order, this disclosure contemplates any suitable steps of the method of FIG. 10 occurring in any suitable order. Moreover, although this disclosure describes and illustrates an example method for determining a canonical place-entity node for a first place-entity cluster including the particular steps of the method of FIG. 10, this disclosure contemplates any suitable method for determining a canonical place-entity node for a first place-entity cluster including any suitable steps, which may include all, some, or none of the steps of the method of FIG. 10, where appropriate. Furthermore, although this disclosure describes and illustrates particular components, devices, or systems carrying out particular steps of the method of FIG. 10, this disclosure contemplates any suitable combination of any suitable components, devices, or systems carrying out any suitable steps of the method of FIG. 0.

Systems and Methods

Figure 11:
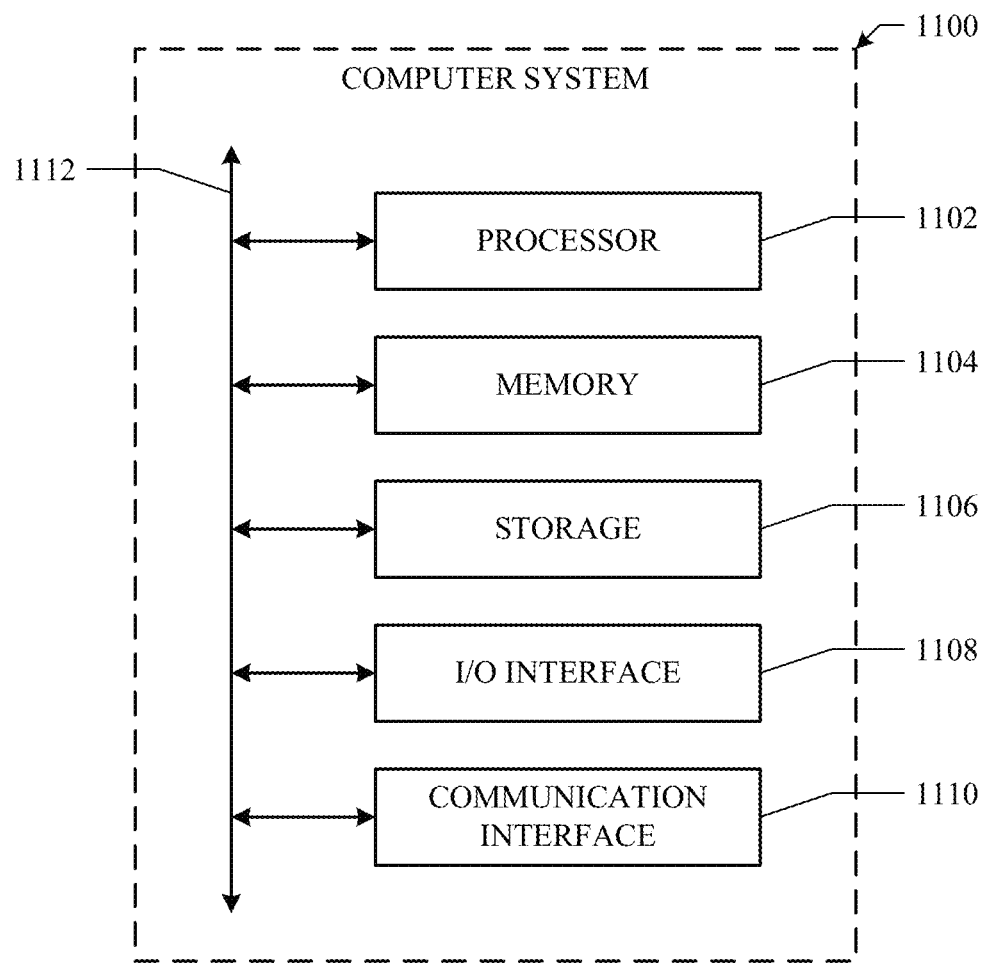
FIG. 11 illustrates an example computer system.

FIG. 11 illustrates an example computer system 1100. In particular embodiments, one or more computer systems 1100 perform one or more steps of one or more methods described or illustrated herein. In particular embodiments, one or more computer systems 1100 provide functionality described or illustrated herein. In particular embodiments, software running on one or more computer systems 1100 performs one or more steps of one or more methods described or illustrated herein or provides functionality described or illustrated herein. Particular embodiments include one or more portions of one or more computer systems 1100. Herein, reference to a computer system may encompass a computing device, and vice versa, where appropriate. Moreover, reference to a computer system may encompass one or more computer systems, where appropriate.

This disclosure contemplates any suitable number of computer systems 1100. This disclosure contemplates computer system 1100 taking any suitable physical form. As example and not by way of limitation, computer system 1100 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1100 may include one or more computer systems 1100; be unitary or distributed; span multiple locations; span multiple machines; span multiple data centers; or reside in a cloud, which may include one or more cloud components in one or more networks. Where appropriate, one or more computer systems 1100 may perform without substantial spatial or temporal limitation one or more steps of one or more methods described or illustrated herein. As an example and not by way of limitation, one or more computer systems 1100 may perform in real time or in batch mode one or more steps of one or more methods described or illustrated herein. One or more computer systems 1100 may perform at different times or at different locations one or more steps of one or more methods described or illustrated herein, where appropriate.

In particular embodiments, computer system 1100 includes a processor 1102, memory 1104, storage 1106, an input/output (I/O) interface 1108, a communication interface 1110, and a bus 1112. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1102 includes hardware for executing instructions, such as those making up a computer program. As an example and not by way of limitation, to execute instructions, processor 1102 may retrieve (or fetch) the instructions from an internal register, an internal cache, memory 1104, or storage 1106; decode and execute them; and then write one or more results to an internal register, an internal cache, memory 1104, or storage 1106. In particular embodiments, processor 1102 may include one or more internal caches for data, instructions, or addresses. This disclosure contemplates processor 1102 including any suitable number of any suitable internal caches, where appropriate. As an example and not by way of limitation, processor 1102 may include one or more instruction caches, one or more data caches, and one or more translation lookaside buffers (TLBs). Instructions in the instruction caches may be copies of instructions in memory 1104 or storage 1106, and the instruction caches may speed up retrieval of those instructions by processor 1102. Data in the data caches may be copies of data in memory 1104 or storage 1106 for instructions executing at processor 1102 to operate on; the results of previous instructions executed at processor 1102 for access by subsequent instructions executing at processor 1102 or for writing to memory 1104 or storage 1106; or other suitable data. The data caches may speed up read or write operations by processor 1102. The TLBs may speed up virtual-address translation for processor 1102. In particular embodiments, processor 1102 may include one or more internal registers for data, instructions, or addresses. This disclosure contemplates processor 1102 including any suitable number of any suitable internal registers, where appropriate. Where appropriate, processor 1102 may include one or more arithmetic logic units (ALUs); be a multi-core processor; or include one or more processors 1102. Although this disclosure describes and illustrates a particular processor, this disclosure contemplates any suitable processor.

In particular embodiments, memory 1104 includes main memory for storing instructions for processor 1102 to execute or data for processor 1102 to operate on. As an example and not by way of limitation, computer system 1100 may load instructions from storage 1106 or another source (such as, for example, another computer system 1100) to memory 1104. Processor 1102 may then load the instructions from memory 1104 to an internal register or internal cache. To execute the instructions, processor 1102 may retrieve the instructions from the internal register or internal cache and decode them. During or after execution of the instructions, processor 1102 may write one or more results (which may be intermediate or final results) to the internal register or internal cache. Processor 1102 may then write one or more of those results to memory 1104. In particular embodiments, processor 1102 executes only instructions in one or more internal registers or internal caches or in memory 1104 (as opposed to storage 1106 or elsewhere) and operates only on data in one or more internal registers or internal caches or in memory 1104 (as opposed to storage 1106 or elsewhere). One or more memory buses (which may each include an address bus and a data bus) may couple processor 1102 to memory 1104. Bus 1112 may include one or more memory buses, as described below. In particular embodiments, one or more memory management units (MMUs) reside between processor 1102 and memory 1104 and facilitate accesses to memory 1104 requested by processor 1102. In particular embodiments, memory 1104 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1104 may include one or more memories 1104, where appropriate. Although this disclosure describes and illustrates particular memory, this disclosure contemplates any suitable memory.

In particular embodiments, storage 1106 includes mass storage for data or instructions. As an example and not by way of limitation, storage 1106 may include a hard disk drive (HDD), a floppy disk drive, flash memory, an optical disc, a magneto-optical disc, magnetic tape, or a Universal Serial Bus (USB) drive or a combination of two or more of these. Storage 1106 may include removable or non-removable (or fixed) media, where appropriate. Storage 1106 may be internal or external to computer system 1100, where appropriate. In particular embodiments, storage 1106 is non-volatile, solid-state memory. In particular embodiments, storage 1106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1106 taking any suitable physical form. Storage 1106 may include one or more storage control units facilitating communication between processor 1102 and storage 1106, where appropriate. Where appropriate, storage 1106 may include one or more storages 1106. Although this disclosure describes and illustrates particular storage, this disclosure contemplates any suitable storage.

In particular embodiments, I/O interface 1108 includes hardware, software, or both, providing one or more interfaces for communication between computer system 1100 and one or more I/O devices. Computer system 1100 may include one or more of these I/O devices, where appropriate. One or more of these I/O devices may enable communication between a person and computer system 1100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1108 for them. Where appropriate, I/O interface 1108 may include one or more device or software drivers enabling processor 1102 to drive one or more of these I/O devices. I/O interface 1108 may include one or more I/O interfaces 1108, where appropriate. Although this disclosure describes and illustrates a particular I/O interface, this disclosure contemplates any suitable I/O interface.

In particular embodiments, communication interface 1110 includes hardware, software, or both providing one or more interfaces for communication (such as, for example, packet-based communication) between computer system 1100 and one or more other computer systems 1100 or one or more networks. As an example and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1110 for it. As an example and not by way of limitation, computer system 1100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1100 may include any suitable communication interface 1110 for any of these networks, where appropriate. Communication interface 1110 may include one or more communication interfaces 1110, where appropriate. Although this disclosure describes and illustrates a particular communication interface, this disclosure contemplates any suitable communication interface.

In particular embodiments, bus 1112 includes hardware, software, or both coupling components of computer system 1100 to each other. As an example and not by way of limitation, bus 1112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1112 may include one or more buses 1112, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing devices:
   receiving, from a client system of a user via a search client, a search query;
   identifying a first place-entity based on the search query;
   accessing a place-entities graph comprising a plurality of place-entity nodes, each place-entity node representing a place-entity associated with a particular geographic location, wherein the first place-entity is represented by a first place-entity node in the place-entities graph;
   accessing a redirection graph of the search client, wherein the redirection graph comprises the plurality of place-entity nodes and a plurality of place-entity clusters, and wherein, for each place-entity node in each place-entity cluster, a redirection edge connects the place-entity node and a respective canonical place-entity node of the place-entity cluster, wherein each place-entity cluster is defined based on duplication-values of place-entity nodes in the place-entity cluster with respect to other place-entity nodes in the place-entity cluster, and wherein a particular place-entity cluster corresponds to a particular geographic location; and
   sending, to the client system, a response to the search query, wherein:
     if the first place-entity node is connected to a canonical place-entity node by a redirection edge within the redirection graph, the response comprises a reference to the canonical place-entity node;
     else the response comprises a reference to the first place-entity node.

2. The method of claim 1, further comprising:
   identifying a search function type of the search query,
   wherein the response to the search query is based on the search function type.

3. The method of claim 2, wherein the redirection graph is a custom redirection graph based on the search function type.

4. The method of claim 1, wherein:
   each of the plurality of place-entity clusters comprises a respective plurality of place-entity nodes; and
   each of the plurality of place-entity nodes of a respective place-entity cluster is associated with a respective duplication-value indicating a likelihood that the place-entity node and a respective canonical node of the place-entity cluster correspond to a same geographic location.

5. The method of claim 4, wherein each redirection edge of the redirection graph is based on the duplication-value of the respective place-entity nodes connected by the redirection edge.

6. The method of claim 4, wherein:
   for each place-entity cluster, the respective canonical place-entity node of the place-entity cluster corresponds to a selected place-entity node of the place-entity cluster; and
   the respective canonical place-entity node is selected based on the respective duplication-value of each place-entity node of the place-entity cluster.

7. The method of claim 4, wherein a redirection edge is established between a place-entity node and a respective canonical place-entity node of a place-entity cluster if the duplication-value of the place-entity node is greater than a threshold duplication-value.

8. The method of claim 7, wherein the threshold duplication-value is based on an attribute of the user.

9. The method of claim 4, wherein:
   the search client is associated with a threshold redirect-value indicating whether to redirect a place-entity to another place-entity in the same place-entity cluster.

10. The method of claim 9, wherein a redirection edge is established between a place-entity node and a respective canonical node of a place-entity cluster if the duplication-value of the place-entity node is greater than the threshold redirect-value.

11. The method of claim 1, further comprising:
    identifying one or more place-entity nodes matching the search query,
    wherein the response to the search query further comprises one or more references to one or more of the identified place-entity nodes matching the search query.

12. The method of claim 11, further comprising:
    ranking the identified place-entity nodes matching the search query; and
    selecting one of the identified place-entity nodes based on their rankings,
    wherein the response to the search query further comprises a reference to the selected place-entity node.

13. The method of claim 12, wherein:
    each place-entity node has a social-graph affinity with respect to the user; and
    the identified place-entity nodes matching the search query are ranked based on their respective the social-graph affinities.

14. The method of claim 1, further comprising:
accessing a second redirection graph of the search client; and
combining the redirection graph and the second redirection graph,
wherein the response to the search query is based on the combined redirection graph and second redirection graph.

15. The method of claim 1, wherein:
the search client is associated with a plurality of redirection graphs; and
each of the plurality of redirection graphs is associated with a respective context.

16. The method of claim 15, further comprising:
identifying a context of the search query; and
selecting, as the redirection graph, one of the plurality of redirection graphs having a respective context that matches the identified context of the search query.

17. The method of claim 1, wherein the redirection graph is personalized for the user.

18. The method of claim 1, wherein:
each place-entity node of each place-entity cluster is associated with a respective quality-score;
for each place-entity cluster, the respective canonical place-entity node of the place-entity cluster is a place-entity node of the place-entity cluster having a highest quality-score; and
the respective quality-score of a place-entity node is based on one or more of an accuracy of attributes of a place-entity associated with the place-entity node, a number of photos associated with the place-entity, an amount of content associated with the place-entity, a recency-value associated with the content or photos, or a number of social signals associated with the place-entity.

19. One or more computer-readable non-transitory storage media embodying software that is operable when executed to:
receive, from a client system of a user via a search client, a search query;
identify a first place-entity based on the search query;
access a place-entities graph comprising a plurality of place-entity nodes, each place-entity node representing a place-entity associated with a particular geographic location, wherein the first place-entity is represented by a first place-entity node in the place-entities graph;
access a redirection graph of the search client, wherein the redirection graph comprises the plurality of place-entity nodes and a plurality of place-entity clusters, and wherein, for each place-entity node in each place-entity cluster, a redirection edge connects the place-entity node and a respective canonical place-entity node of the place-entity cluster, wherein each place-entity cluster is defined based on duplication-values of place-entity nodes in the place-entity cluster with respect to other place-entity nodes in the place-entity cluster, and wherein a particular place-entity cluster corresponds to a particular geographic location; and
send, to the client system, a response to the search query, wherein:
if the first place-entity node is connected to a canonical place-entity node by a redirection edge within the redirection graph, the response comprises a reference to the canonical place-entity node;
else the response comprises a reference to the first place-entity node.

20. A system comprising: one or more processors; and a memory coupled to the processors comprising instructions executable by the processors, the processors operable when executing the instructions to:
receive, from a client system of a user via a search client, a search query;
identify a first place-entity based on the search query;
access a place-entities graph comprising a plurality of place-entity nodes, each place-entity node representing a place-entity associated with a particular geographic location, wherein the first place-entity is represented by a first place-entity node in the place-entities graph;
access a redirection graph of the search client, wherein the redirection graph comprises the plurality of place-entity nodes and a plurality of place-entity clusters, and wherein, for each place-entity node in each place-entity cluster, a redirection edge connects the place-entity node and a respective canonical place-entity node of the place-entity cluster, wherein each place-entity cluster is defined based on duplication-values of place-entity nodes in the place-entity cluster with respect to other place-entity nodes in the place-entity cluster, and wherein a particular place-entity cluster corresponds to a particular geographic location; and
send, to the client system, a response to the search query, wherein:
if the first place-entity node is connected to a canonical place-entity node by a redirection edge within the redirection graph, the response comprises a reference to the canonical place-entity node;
else the response comprises a reference to the first place-entity node.

* * * * *